United States Patent
De Maria et al.

(10) Patent No.: US 7,215,639 B2
(45) Date of Patent: May 8, 2007

(54) CONGESTION MANAGEMENT FOR PACKET ROUTERS

(75) Inventors: Marcelo A. R. De Maria, Montreal (CA); Richard S. Norman, Sutton (CA); Jean Bélanger, Montreal (CA); Eyad Saheb, Montreal (CA)

(73) Assignee: 4198638 Canada Inc., St-Laurent, Quebec (CA)

( * ) Notice: Subject to any disclaimer, the term of this patent is extended or adjusted under 35 U.S.C. 154(b) by 1064 days.

(21) Appl. No.: 09/943,004

(22) Filed: Aug. 31, 2001

(65) Prior Publication Data

US 2003/0043742 A1  Mar. 6, 2003

(51) Int. Cl.
| | |
|---|---|
| H04L 12/26 | (2006.01) |
| H04L 1/00 | (2006.01) |
| H04L 12/28 | (2006.01) |
| H04L 12/56 | (2006.01) |
| H04L 12/54 | (2006.01) |
| G08C 15/00 | (2006.01) |
| G01R 31/08 | (2006.01) |
| G06F 11/00 | (2006.01) |
| H04J 3/14 | (2006.01) |

(52) U.S. Cl. ............ 370/235; 370/400; 370/412; 370/422; 370/429

(58) Field of Classification Search ........ 370/230–234, 370/235–236, 229–230.1, 237, 400–401, 370/412–413, 415, 417, 422, 428–429

See application file for complete search history.

(56) References Cited

U.S. PATENT DOCUMENTS

| | | | |
|---|---|---|---|
| 5,115,429 A | 5/1992 | Hluchyj et al. | |
| 5,313,454 A | 5/1994 | Bustini et al. | |
| 5,426,640 A | 6/1995 | Hluchyj et al. | |
| 5,436,891 A | 7/1995 | Grossman et al. | |
| 5,497,375 A | 3/1996 | Hluchyj et al. | |
| 5,629,927 A | 5/1997 | Waclawsky et al. | |
| 5,787,071 A | 7/1998 | Basso et al. | |
| 5,790,522 A | 8/1998 | Fichou et al. | |
| 5,815,492 A | 9/1998 | Berthaud et al. | |
| 5,838,922 A * | 11/1998 | Galand et al. | ............... 709/232 |

(Continued)

FOREIGN PATENT DOCUMENTS

EP     0 748 087       11/1996

OTHER PUBLICATIONS

International Search Report PCT/CA02/01338, Apr. 14, 2003.

(Continued)

*Primary Examiner*—Kevin C. Harper

(57) ABSTRACT

A method and system for regulating packet flow to a downstream entity capable of forwarding packets to a plurality of intermediate destinations. The method includes maintaining a database of queues, each queue in the database being associated with packets intended to be forwarded to a corresponding one of a plurality of final destinations via a corresponding one of the intermediate destinations. Each queue in the database is further associated with a state that is either active or inactive. Upon receipt of a message from the downstream entity indicating a reduced (increased) ability of a particular one of the intermediate destinations to accept packets intended to be forwarded to a particular one of the final destinations, the method provides for rendering inactive (active) the state of the queue associated with packets intended to be forwarded to the particular final destination via the particular intermediate destination.

42 Claims, 16 Drawing Sheets

U.S. PATENT DOCUMENTS

| | | | |
|---|---|---|---|
| 5,898,691 A | | 4/1999 | Liu |
| 5,912,894 A | | 6/1999 | Duault et al. |
| 5,978,359 A | * | 11/1999 | Caldara et al. ............. 370/236 |
| 6,011,776 A | | 1/2000 | Berthaud et al. |
| 6,091,708 A | | 7/2000 | Matsunuma |
| 6,108,304 A | | 8/2000 | Abe et al. |
| 6,118,791 A | | 9/2000 | Fichou et al. |
| 6,405,258 B1 | * | 6/2002 | Erimli et al. ................ 709/235 |
| 6,424,624 B1 | | 7/2002 | Galand et al. |
| 6,430,155 B1 | | 8/2002 | Davie et al. |
| 6,654,343 B1 | * | 11/2003 | Brandis et al. ............. 370/229 |
| 6,717,912 B1 | * | 4/2004 | Lemyre et al. ............. 370/230 |
| 6,728,211 B1 | * | 4/2004 | Peris et al. ................. 370/235 |
| 6,856,595 B1 | * | 2/2005 | Brown ....................... 370/229 |
| 2002/0075873 A1 | * | 6/2002 | Lindhorst-Ko et al. ..... 370/394 |
| 2003/0021230 A1 | * | 1/2003 | Kuo et al. .................. 370/230 |

OTHER PUBLICATIONS

Pombortsis A et al: "A novel flow control and switching strategy for preventing hotspot congestion in multistage networks" Microprocessors and Microsystems, IPC, Business Press Ltd. London, GB, vol. 17, No. 7, Sep. 1, 1993 pp. 403-410, XP000397912, ISSN: 0141-9331 p. 403, right-hand column, paragraph 2, p. 404, left-hand column, paragraph 3, p. 405, left-hand column, paragraph 2 and p. 407, left-hand column, paragraph 1.

BLUE: A new class of active queue management algorithms, Wu-Chang Feng, Dilip D. Kandlur, Debanjan Saha and Kang G. Shin, proceedings of IEEE Int'l workshop on network and operating system support for digital audio & video Conference dates: Jun. 25, 2001 and Jun. 26, 2001.

* cited by examiner

DEFINES A FLOW

| NEXT HOP PORT | FINAL HOP PORT | SERVICE CLASS | LINKED LIST OF ADDRESSES IN PACKET MEMORY 210 | ACTIVE / INACTIVE |
|---|---|---|---|---|
| 14A | 14E | LOW | XX, XX, XX | XX |
| 14A | 14E | MED | XX, XX, XX | XX |
| 14A | 14E | HIGH | XX, XX, XX | XX |
| 14A | 14F | LOW | XX, XX, XX | XX |
| 14A | 14F | MED | XX, XX, XX | XX |
| 14A | 14F | HIGH | XX, XX, XX | XX |
| 14A | 14G | LOW | XX, XX, XX | XX |
| 14A | 14G | MED | XX, XX, XX | XX |
| 14A | 14G | HIGH | XX, XX, XX | XX |
| 14A | 14H | LOW | XX, XX, XX | XX |
| 14A | 14H | MED | XX, XX, XX | XX |
| 14A | 14H | HIGH | XX, XX, XX | XX |
| 14B | 14E | LOW | XX, XX, XX | XX |
| ••• | | | | |
| 14D | 14H | HIGH | XX, XX, XX | XX |

USED BY QUEUE PROCESSOR 220 TO TRANSMIT TO NEXT HOP PORT 14A

232

LEGEND:
 MICRO-QUEUE

Fig. 4

| FINAL HOP PORT | PACKET TYPE | LINKED LIST OF ADDRESSES IN PACKET MEMORY 210' | ACTIVE / INACTIVE |
|---|---|---|---|
| 14E | MULTICAST LOW | XX, XX, XX | XX |
| 14E | MULTICAST MED | XX, XX, XX | XX |
| 14E | MULTICAST HIGH | XX, XX, XX | XX |
| 14E | CONGESTION MANAGEMENT | XX, XX, XX | XX |
| 14E | OTHER | XX, XX, XX | XX |
| 14F | MULTICAST LOW | XX, XX, XX | XX |
| ••• | | | |
| 14H | OTHER | XX, XX, XX | XX |

734 labels the group of rows; the bracket on the right (rows 14E) is labeled "USED BY QUEUE PROCESSOR 220' TO TRANSMIT TOWARDS FINAL HOP PORT 14E".

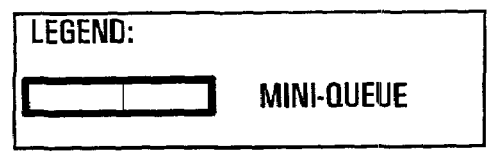

LEGEND:
▭ MINI-QUEUE

Fig. 8

CONGESTION MANAGEMENT FOR PACKET ROUTERS

FIELD OF THE INVENTION

The present invention relates generally to multi-stage architectures for routing packets and, more particularly, to a method and apparatus for managing congestion in such architectures.

BACKGROUND OF THE INVENTION

A router is a device with input ports and output ports, and capable of deciding to which output port it should forward a packet received via one of its input ports so as to move the packet closer to an end destination (usually specified within the packet itself). A device of this type may be equipped with a plurality of internal switching stages, where packets pass through a series of one or more intermediate (or "next hop") ports before emerging at a "final hop" port corresponding to one of the output ports of the router.

One of the advantages of packet forwarding systems is that data of varying priorities (or, more generally, service "classes") can be transmitted simultaneously using the same physical link. Thus, a stream of packets arriving at an input port of a router may contain packets corresponding to different service classes. In the following, packets that belong to the same service class and which are forwarded to the same final hop port will be said to belong to the same "flow".

It is to be noted that the next hop port for packets belonging to the same flow might be different from one packet to the next, depending on such factors as packet attributes, load balancing issues, and so on. Therefore, it is possible that a sequence of packets belonging to the same flow will follow different paths through the router. Since each path may have its own delay and loss characteristics, packets belonging to the same flow may need to be reordered upon exiting the router in order to reconstitute the order in which the packets originally arrived at the router.

It should be apparent that the number of possible internal paths through the router for a single flow increases with the number of switching stages and also with the number of input-to-output combinations per switching stage. As routers become designed to take on numerous switching stages and/or numerous ports per stage, the number of possible paths for all possible flows through a router can be on the order of millions or more. Simply ignoring this in managing congestion only by final hop port is impractical in scalable systems because avoiding internal flow convergence would require an N-fold switch fabric speedup to support N ports, which is impractical as the port count scales beyond a few ports. Faced with this immense and heretofore unimagined complexity, conventional routing algorithms are ill-equipped to deal with congestion, as is now explained.

Under some conditions, an output port of the router may become congested with respect to packets of a certain flow. This is typically the case for lower priority packets in a given flow but may generally affect packets belonging to any service class. In any event, it becomes impossible to send packets of a certain service class out of a given out output port of the router. Since a flow may consist of many different paths through the router, congestion affecting a flow at the output of the router will cause congestion along each of these individual paths. The severity of the congestion resulting at an individual next hop port that supports the affected flow will depend on such factors as the stage of switching at which the next hop port is located, the number of packets taking that path, the number of congested paths converging at that next hop port, etc. Because of variations in the severity of the congestion across different next hop ports, some of the next hop ports at an intermediate routing stage will no longer be capable of accepting packets belonging to the affected flow, while other next hop ports may still have the capacity to accept packets belonging to that flow. This also applies to situations where an intermediate hop port is congested that others for a flow due to degraded or non-functional switch fabric links, etc.

However, conventional routers do not have the capability to apply different scheduling paradigms to different packets belonging to the same flow. Therefore, in a situation such as the one just described, where different next hop ports at a same stage of switching have different capacities to accept packets belonging to an affected flow, a conventional router will either block/drop all packets belonging to the affected flow or will block/drop all packets going through each next hop port that supports the affected flow. The former option results in a reduction in the pipelining efficiency of a multi-stage router with a corresponding reduction in the ability of the router to operate at a high throughput when the congestion is short-lived and/or recurring, while the latter option results in reduced throughput and increased delay for all previously unaffected flows passing through the (now blocked) next hop ports.

SUMMARY OF THE INVENTION

If it is desired to scale to thousands of ports and beyond without unduly incurring packet loss and without unduly increasing delay, it becomes necessary to consider more sophisticated methods of controlling packet flow through a router, especially a multi-stage router where different packets belonging to the same flow may travel along different paths. Applicants have recognized the significance of deciding to route a packet to a particular next hop port at an intermediate stage of switching on the basis of the packet's flow and the identity of the next hop port itself, as well as on the basis of information regarding the ability of the next hop port to accept packets belonging to the flow in question.

In this way, the effect of congestion stemming from an affected flow associated with a particular next hop port at an intermediate stage of switching does not necessarily transfer to other flows being routed through that same next hop port. Similarly, the effect does not necessarily transfer to other next hop ports that support the affected flow. As a result, unnecessary blocking and delays are avoided and overall throughput of the router is improved.

Therefore, according a first broad aspect, the invention provides a method of regulating packet flow to a downstream entity capable of forwarding packets to a plurality of intermediate destinations. The method includes maintaining a database of queues, each queue in the database being associated with packets intended to be forwarded to a corresponding one of a plurality of final destinations via a corresponding one of the intermediate destinations, each queue in the database being further associated with a state that is either active or inactive. Upon receipt of a message from the downstream entity indicating a reduced (increased) ability of a particular one of the intermediate destinations to accept packets intended to be forwarded to a particular one of the final destinations, the method provides for rendering inactive (active) the state of the queue associated with packets intended to be forwarded to the particular final destination via the particular intermediate destination.

In a specific embodiment, for each intermediate destination, packets are then scheduled for transmission to the intermediate destination from amongst the packets belonging to those queues for which the state is active and that are associated with packets intended to be forwarded to any final destination via the intermediate destination. It may then be determined whether the downstream entity has an ability to receive at least one packet and, if so, one or more packets that has been scheduled for transmission to one of the intermediate destinations may be selected for transmission to the downstream entity.

In another specific embodiment, information may be maintained on memory utilization for each of a plurality of flows, each flow being associated with a corresponding one of the final destinations. If memory utilization for a particular one of the flows exceeds a first threshold, a message is generated which is indicative of a reduced ability of the congestion manager to accept packets intended to be forwarded to the final destination associated with the particular flow. Conversely, if memory utilization for a particular one of the flows falls below a second threshold, a message is generated which is indicative of an increased ability of the congestion manager to accept packets intended to be forwarded to the final destination associated with the particular flow.

In a specific embodiment, an acknowledgement database may be maintained. The acknowledgement database includes an entry for each combination of upstream source and final destination and an indication of whether the upstream source in each combination of upstream source and final destination has acknowledged receipt of a message previously sent to the plurality of upstream sources and indicative of an increased (reduced) ability of the congestion manager to accept packets intended to be forwarded to the final destination. Upon receipt of a message from a particular one of the upstream sources acknowledging receipt of a message previously sent to the plurality of upstream sources and indicative of an increased (reduced) ability of the congestion manager to accept packets intended to be forwarded to a particular final destination, the entry in the acknowledgement database which corresponds to the combination of particular upstream source and particular final destination is updated.

The method may be implemented in at least one of the intermediate destinations. The method may be embodied by a sequence of instructions stored on a computer-readable storage medium. In some embodiments, the queues in the database may additionally be associated with packets of a corresponding one of a plurality of service classes. In this case, the method may include maintaining a queue of active queues for each service class, wherein each queue in the queue of queues for a particular service class has a state that is active. For each intermediate destination, packets are scheduled for transmission to the intermediate destination from amongst the packets in the queues contained in each queue of active queues.

According to another broad aspect, the invention may be summarized as a congestion manager for regulating packet flow to a downstream entity capable of forwarding packets to a plurality of intermediate destinations. The congestion manager includes a queue processor for maintaining information on a plurality of queues, each queue being associated with packets intended to be forwarded to a corresponding one of a plurality of final destinations via a corresponding one of the intermediate destinations. The congestion manager further includes a controller in communication with the queue processor.

The controller is adapted to maintain information on a state of each queue, where the state of a queue is either active or inactive. The controller is further adapted to respond to a message from a particular one of the intermediate destinations indicative of a reduced (increased) ability of the particular intermediate destination to accept packets intended to be forwarded to a particular one of the final destinations by rendering inactive (active) the state of the queue associated with packets intended to be forwarded to a particular one of the final destinations via the particular intermediate destination.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 4 illustrates one example of the way in which a queue database in the congestion manager of FIG. 3 can be organized;

FIG. 8 illustrates one example of the way in which a portion of the queue database in the congestion manager of FIG. 7 can be organized;

DETAILED DESCRIPTION OF THE PREFERRED EMBODIMENTS

Figure 1A:
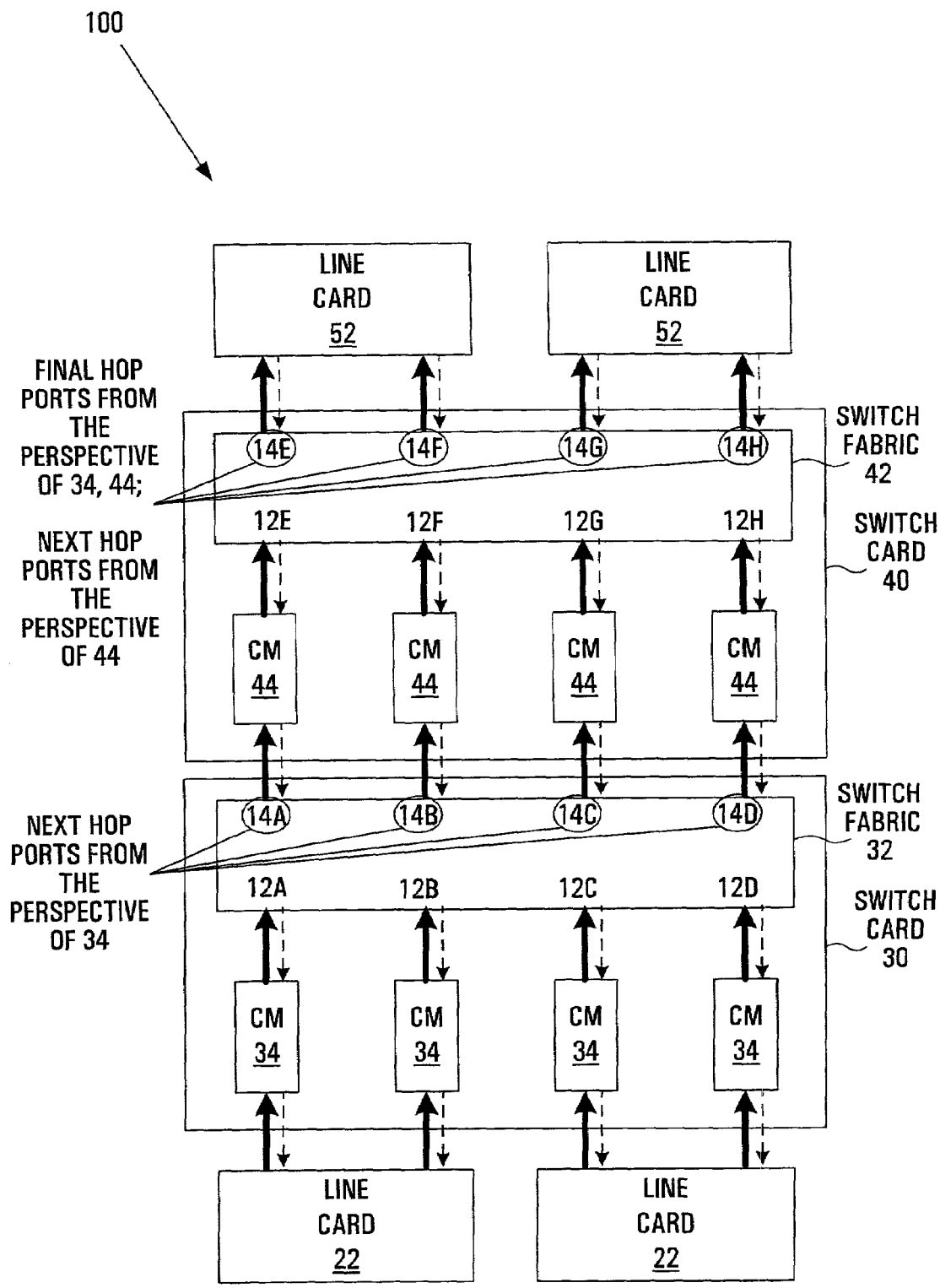
FIGS. 1A and 1B depict two implementations of a multistage packet router in block diagram form, including a plurality of congestion managers adapted to communicate using a congestion management protocol, in accordance with an embodiment of the present invention.

With reference to FIG. 1A, there is shown a configuration of a router 100 having multiple switching stages between a plurality of input line cards 22 and a plurality of output line cards 52. Specifically, the input line cards 22 are connected to input ports of a switch card 30. Switch card 30 has a plurality of output ports that are connected to input ports of another switch card 40. Switch card 40 has a plurality of output ports connected to the output line cards 52. Switch card 30 allows packets arriving from any port on any of the input line cards 22 to be switched to any of the output ports of switch card 30. Similarly, switch card 40 allows packets arriving via any of its input ports to be switched to any port on any of the output line cards 52.

Switch card 30 includes a switch fabric 32 having a plurality of input ports 12A–12D and a plurality of output ports 14A–14B. The switch fabric 32 provides a first stage of switching for packets exiting the input line cards 22. A plurality of congestion management entities 34, referred to herein after as congestion managers, regulates the flow of packets received from the input line cards 22 that are sent to the plurality of input ports 12A–12D of the switch fabric 32. Similarly, switch card 40 includes a switch fabric 42 having a plurality of input ports 12E–12H and a plurality of output ports 14E–14H. Switch fabric 42 provides a second stage of switching for packets exiting the input line cards 22. A plurality of congestion managers 44 regulates the transmission of packets received from switch card 30 to the plurality of input ports 12E–12H of the switch fabric 42.

Each packet received by one of the input ports 12A–12D of switch fabric 32 via the corresponding congestion manager 34 and the corresponding port of one of the input line cards 22 is destined for a particular output port 14E–14H of switch fabric 42. Such a "final destination" output port 14E–14H of switch fabric 42 can be referred to as a "final hop port". Meanwhile, however, the packet must transit through switch fabric 32, exiting via one of the output ports 14A–14D. The packet can thus be said to acquire an "intermediate destination" (or "next hop port") as it travels through each switching stage. It is noted that in the illustrated embodiment, the intermediate destination of a packet transiting through switch fabric 42 will also be the packet's final destination. Of course, the router may be composed of many more than two switching stages, and a packet flowing through the router on its way to its final destination (or final hop port) will acquire a different intermediate destination (or next hop port) at each switching stage along the way.

In the embodiment illustrated in FIG. 1A, packets travel from the input line cards 22 to the switch card 30, from the switch card 30 to the switch card 40 and from the switch card 40 to the output line cards 52. It should be understood, however, that such unidirectional behaviour is not a limitation of the present intention; rather, as now described, the present invention is applicable to both unidirectional and bidirectional switch cards and line cards.

Figure 1B:
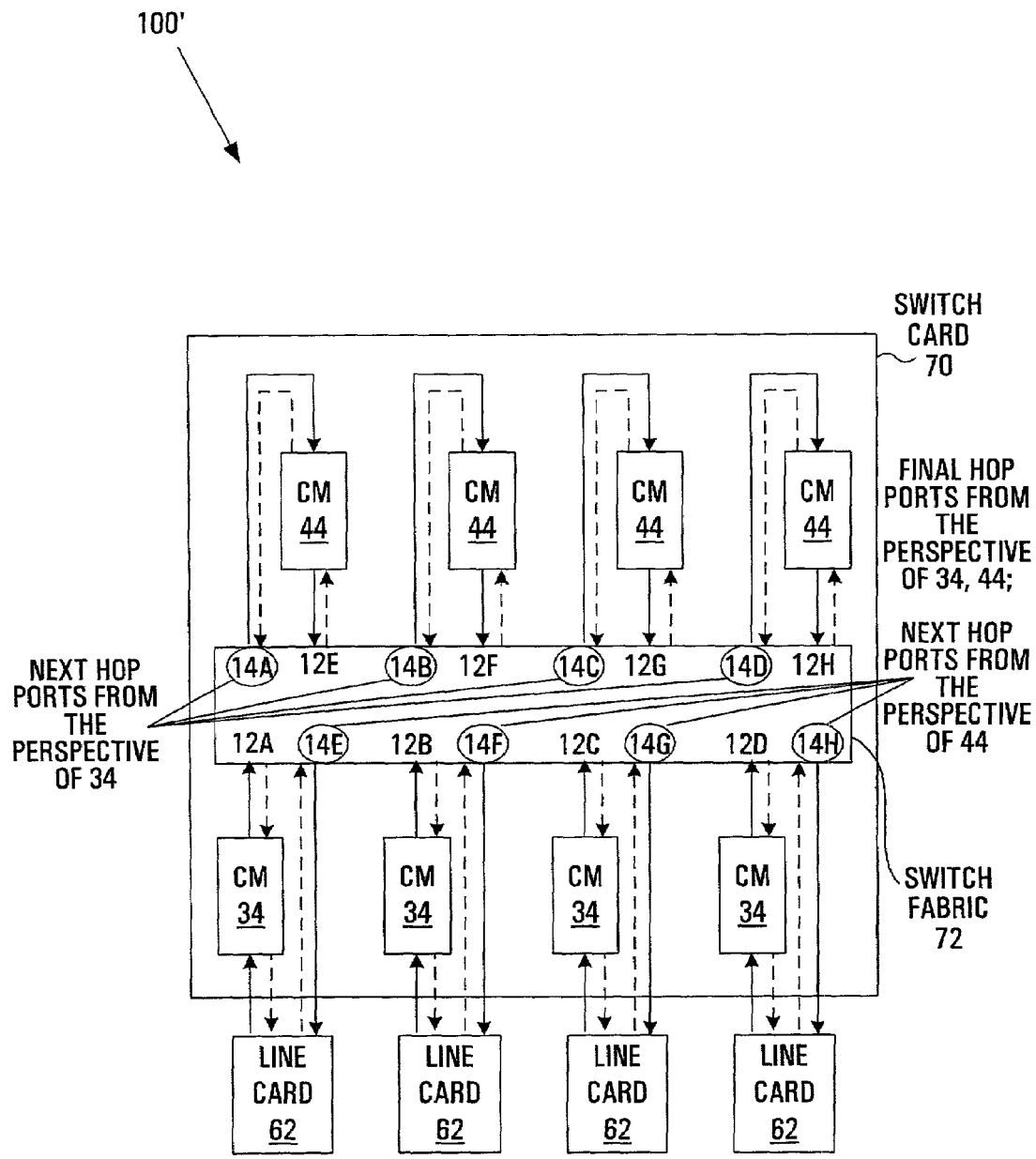

With reference to FIG. 1B, there is shown a configuration of a router 100' with a single switch card 70 wherein the switch card 70 provides both a first and a second stage of switching. The switch card 70 has a switch fabric 72 with a plurality of input ports 12A–12H and a plurality of output ports 14A–14H. A plurality of bidirectional line cards 62 provide packets to input ports 12A–12D of the switch fabric 72 via a first plurality of congestion managers 34. Output ports 14A–14D of the switch fabric 72 are connected to input ports 12E–12H of the same switch fabric 72 via a second plurality of congestion managers 44. Output ports 14E–14 are connected to the bidirectional line cards 62.

In operation, the switch fabric 72 provides a first stage of switching, for packets entering input ports 12A–12D via the bidirectional line cards 62 and the congestion managers 34. Switched packets emerge at output ports 14A–14D. The packets exiting the output ports 14A–14D then travel through the congestion managers 44 and re-enter the switch fabric 72 via input ports 12E–12H. These re-entrant packets are then switched a second time by the switch fabric 72, which provides twice switched packets to the bidirectional line cards 62 via output ports 14E–14H.

Those skilled in the art will appreciate that output ports 14A–14D are next hop ports and output ports 14E–14H are final hop ports, from the perspective of packets undergoing the first stage of switching upon entering the switch fabric 72 via input ports 12A–12D. Also, output ports 14E–14H are both next hop ports and final hop ports, from the perspective of packets undergoing the second stage of switching upon entering the switch fabric 72 via input ports 12E–12H.

In the illustrated embodiments, the flow of data has been shown by solid lines with arrows. Also illustrated are dashed lines flowing in the opposite direction which provide a control link between entities in different stages. Thus, for example, in FIG. 1A, control links are present between the input line cards 22 and the congestion managers 34, between the congestion managers 34 and the switch fabric 32, between the switch fabric 32 and the congestion managers 44, between the congestion managers 44 and the switch fabric 42 and between the switch fabric 42 and the output line cards 52. In FIG. 1B, control links are present between the bidirectional line cards 62 and the congestion managers 34, between the congestion managers 34 and the switch fabric 72, between the switch fabric 72 and the congestion managers 44, between the congestion managers 44 and the switch fabric 72 and between the switch fabric 72 and the bidirectional line cards 62.

It should be understood that standard techniques for exchanging control information can be employed, including the use of a dedicated control channel, in-band signalling, and so on. Also, although the arrow on the dashed lines connotes unidirectionality, it may be advantageous in some embodiments (e.g., in the embodiments of FIGS. 11 and 12 described later on) to convey control information in the same direction as that of data packet flow. All such variations and permutations can enhance functionality without departing from the spirit of the present invention.

A stream of packets destined for the same final hop port 14E–14H is herein after referred to as a "flow". The flow may also be qualified by a service class common to each packet in the flow. Thus, all packets belonging to, say, a "high-priority" flow associated with a given final hop port, say port 14G, are high-priority packets and all such packets are ultimately destined for port 14G. Various service classes are possible and may include a wide range of known service classes and qualities of service (QoS), for example, continuous bit rate, available bit rate, unspecified bit rate, variable bit rate, etc. Any service class that may as of yet still be undefined would also be suitable for qualifying a flow.

Those skilled in the art should appreciate that not all packets belonging to the same flow will travel along the same path through the router 100. That is to say, different packets having the same final hop port and belonging to the same service class may acquire different next hop ports as they travel through the switch fabrics 32, 42 of the router 100. This may be due to such factors as different attributes being associated with different packets, or load distribution algorithms being implemented at one or more switching stages. The net effect is that the same flow may consist of a plurality of possible paths through the switching stages of the router 100. Consequently, a single port at an intermediate switching stage may be the next hop port for multiple flows and the same flow may be supported by multiple next hop ports across a single intermediate switching stage.

According to an embodiment of the present invention, a packet entering one of the switch cards 30, 40 is scheduled for transmission to the corresponding switch fabric 32, 42 on the basis of its flow and also on the basis of the next hop port to which the packet must be forwarded. The reason why this is advantageous will be apparent from the following. Assume, for example, that there is but a single source of congestion affecting packets of a particular service class, say "medium priority", at one of the output ports of switch fabric 42, say output port 14H. Call this flow the "affected" flow. Since the affected flow may have followed multiple paths through the switch fabric 42, congestion associated with the affected flow at output port 14H will trigger congestion at the input ports 12E–12H to the switch fabric 42 further upstream.

However, any such congestion should not be allowed to affect other flows, which should continue to be properly switched by the switch fabric 42. Moreover, the level of congestion at each of the input ports 12E–12H will vary, depending on the memory available at each input port, etc. Since the degree of congestion at each of the input ports 12E–12H may vary, one therefore has the situation whereby packets that belong to the affected flow should be allowed to reach some of the input ports and should be prevented from reaching other input ports of the switch fabric 42. At the same time, packets that do not belong to the affected flow must at all times be allowed to reach the input ports 12E–12H of the switch fabric 42.

Since the input ports 12E–12H of the switch fabric 42 are connected (via the congestion managers 44) to the output ports 14A–14D of the switch fabric 32, the above requirements can be expressed as follows: packets belonging to the affected flow should be allowed to reach some of the output ports 14A–14D of the switch fabric 32 and should be prevented from reaching other output ports of the switch fabric 32. At the same time, packets that do not belong to the affected flow must at all times be allowed to reach the output ports 14A–14D of the switch fabric 32.

Thus, there is a need for providing some form of scheduling in order to prevent packets belonging to the affected flow from being sent into the switch fabric 32 if they are being routed to one of the output ports 14A–14D of the switch fabric 32 for which the corresponding input port 12E–12H of the switch fabric 42 cannot accept packets belonging to the affected flow. Moreover, this scheduling must take into account the packet's flow, as well as the next hop port to which the packet is being routed and the ability of this next hop port to accept packets belonging to the packet's flow. Accordingly, the present invention provides for occupancy information to be exchanged between the congestion managers 34, 44 in different switching stages by virtue of a flow management protocol, as now described with reference to FIG. 2.

Figure 2:
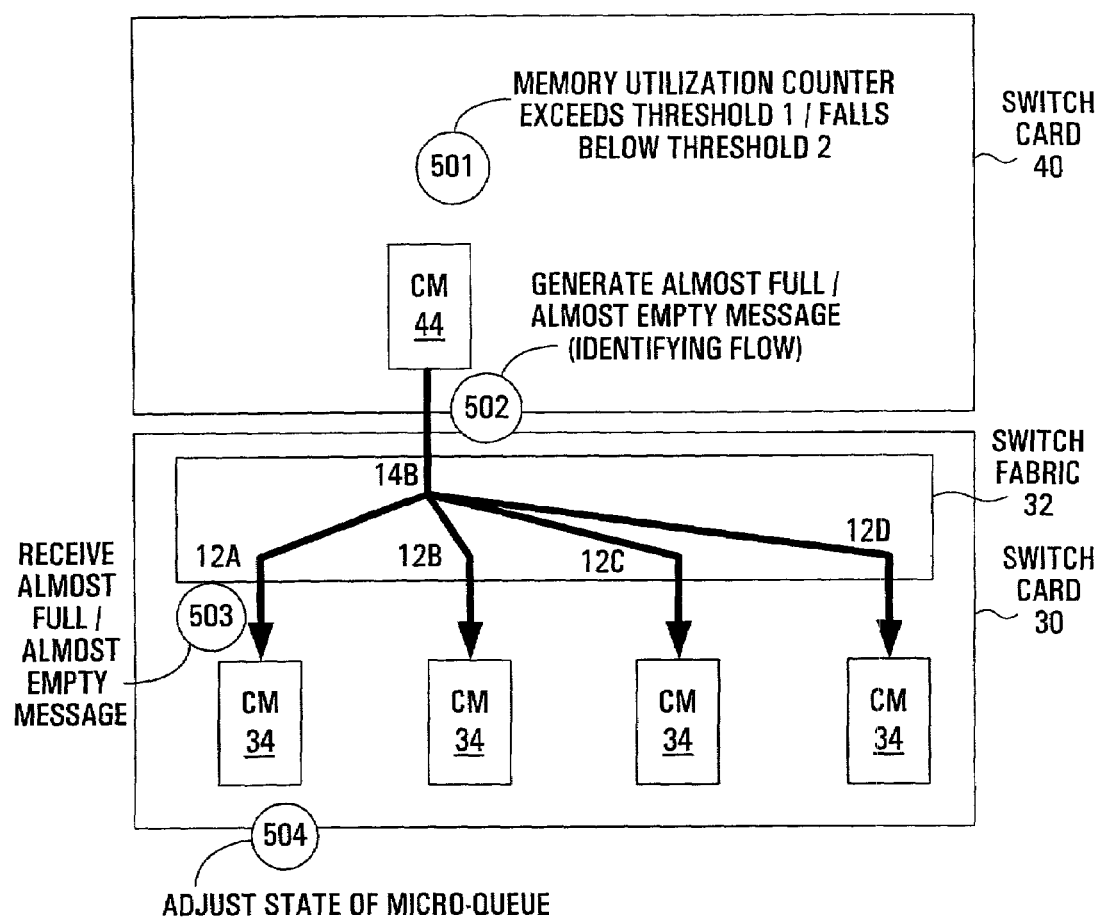
FIG. 2 is a signal flow diagram illustrating transmission and reception of a memory occupancy message by the congestion managers of FIG. 1A.

By way of illustrative example, FIG. 2 illustrates four steps 501, 502, 503, 504 in an example flow management protocol. Steps 501 and 502 are implemented by a downstream congestion manager (e.g., one of the congestion managers 44, which is downstream relative to congestion managers 34), while steps 503 and 504 are implemented by an upstream congestion manager (such as one of the congestion managers 34, which is upstream relative to the congestion managers 44). Steps 501 and 502 will be described in greater detail later on with reference to FIG. 6A, while steps 503 and 504 will be described in greater detail later on with reference to FIG. 6B.

Of course, it is to be understood that a congestion manager which is downstream relative to a first set of congestion managers and upstream relative to a second set of congestion managers may implement steps 501 and 502 when communicating with the first set of congestion managers and may implement steps 503 and 504 when communicating with the second set of congestion managers.

At step 501, congestion manager 44 determines that a counter it uses to track memory utilization for a particular flow has exceeded a certain threshold value (threshold 1) or has fallen below a certain other threshold value (threshold 2). Memory utilization counters of this type are described in further detail below. If the memory utilization counter has exceeded threshold 1, then at step 502, the congestion manager 44 generates an "almost full" message identifying the flow in question; alternatively, if the memory utilization counter has dropped below threshold 2, then step 502 consists of the congestion manager 44 generating an "almost empty" message identifying the flow in question.

As part of step 502, the almost full or almost empty message is sent to the upstream congestion managers 34. This may be achieved by broadcasting the message or by multicasting the message to only those upstream congestion managers 34 that have recently sent packets belonging to the flow in question. The latter approach may provide a savings in terms of bandwidth resource usage for non-traffic packets.

The upstream congestion managers 34 perform steps 503 and 504. At step 503, the almost full or almost empty message is received by the congestion managers 34. At step 504, each of the congestion managers 34 activates or deactivates a "micro-queue" (to be described later on) that is associated both with the flow in question and with the identity of the one congestion manager 44 from which the almost full or almost empty message has been received.

More specifically, if the received message is an almost full message, then the congestion managers 34 will render "inactive" the relevant micro-queues, while if the received message is an almost empty message, then the congestion managers 34 will render "active" the relevant micro-queues. The state of a micro-queue ("active" or "inactive") has an effect on whether packets belonging to the associated flow and intended to be sent to the associated next hop port are indeed eligible for transmission to the next hop port.

Figure 3:
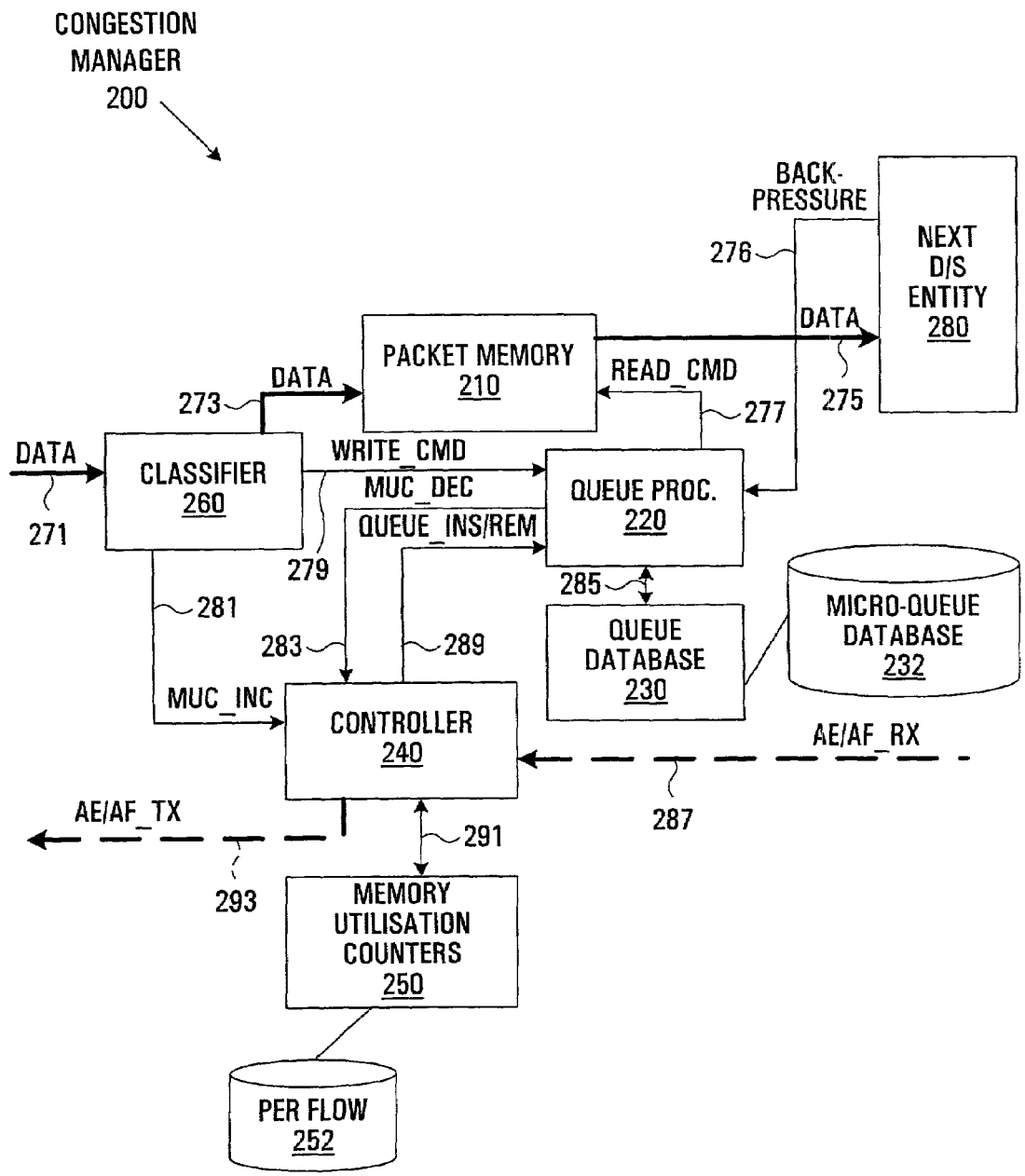
FIG. 3 is a block diagram of functional elements of a congestion manager such as one of the congestion managers of FIGS. 1A and 1B, according to an embodiment of the present invention.

FIG. 3 illustrates in greater detail the structure of a specific embodiment of a congestion manager 200 capable of implementing steps 501–504. The congestion manager 200 represents a congestion manager that is capable of communicating with both a downstream congestion manager (at a next switching stage) and an upstream congestion manager (at a previous switching stage). Thus, the congestion manager 200 represents one of the congestion managers 34 of FIGS. 1A and 1B additionally equipped with the additional ability to communicate with an upstream congestion manager. The congestion manager 200 can also be viewed as representing one of the congestion managers 44 of FIGS. 1A and 1B with the additional ability to communicate with a downstream congestion manager.

As shown in FIG. 3, the congestion manager 200 includes a packet memory 210, a queue processor 220, a queue database 230, a controller 240, a set of memory utilization counters 250 and a classifier 260. Packets entering the congestion manager 200 arrive at the classifier 260 via a DATA link 271. Each packet entering the classifier 260 specifies a final hop port associated with that packet. The final hop port may be specified in the packet's header, for example. For packets entering any of the congestion managers 34, 44 in FIGS. 1A and 1B, possible final hop ports include ports 14E–14H of switch fabric 42.

The classifier 260 comprises suitable circuitry, software and/or control logic for selecting the path that each received packet will take, on the basis of the flow (the final hop port and, if appropriate, the service class) of the packet, as well as on the basis of a set of paths found in a global address table and on the basis of link failure information. Thus, the classifier 260 determines the next hop port of each packet and may insert this information into the header of the packet. For congestion managers 34, possible next hop ports include 14A–14D of switch fabric 32.

Once the classifier 260 determines the next hop port of a packet, the packet is sent to the packet memory 210 along a DATA link 273. At or around the same time, the classifier 260 issues a write command to the queue processor 220 along a WRITE_CMD link 279. The write command on the WRITE_CMD link 279 instructs the queue processor 220 to write the packet presently on the DATA link 273 somewhere in the packet memory 210. The write command specifies the flow to which the packet belongs, as well as the next hop port to which the packet is to be sent. Meanwhile, the identity of the flow to which the packet belongs is provided to the controller 240 via a MUC_INC link 281. As will be seen later on with regard to the memory utilization counter 250, the flow information on the MUC_INC link 281 is used by the controller 240 to update the memory utilization counters 250.

The queue processor 220 manages the queue database 230, to which it is connected via an access link 285. The queue database 230 includes a micro-queue database 232, conceptually illustrated in FIG. 4. It is seen that there is one micro-queue defined for each combination of next hop port and flow (i.e., for each combination of next hop port, final hop port and, if applicable, service class). Each micro-queue so defined is associated with a linked list of, or pointer to, addresses in the packet memory 210 which correspond to that micro-queue. A packet is added to the linked list of a particular micro-queue by virtue of a write command being received from the classifier 260 along on the WRITE_CMD link 279. It is recalled that the write command specifies the flow and the next hop port associated with the packet to be written into the packet memory 210.

It should be noted that each micro-queue may be either "active" or "inactive" at a given time, depending on conditions affecting the flow and/or the next hop port that define the micro-queue in question. An active micro-queue is a micro-queue whose packets can be scheduled for transmission without the risk of being blocked, while an inactive micro-queue is associated with packets that cannot be scheduled without risk of being blocked. The controller 240 may render a micro-queue active or inactive by issuing a command which is received by the queue processor 220 along a QUEUE_INS/REM link 289.

Furthermore, the queue processor 220 includes circuitry, software and/or control logic for performing scheduling of packets in the active micro-queues. For data packets, such scheduling is performed independently for each next hop port, which means independently for each set of micro-queues corresponding to a given next hop port. Thus, packets belonging to active micro-queues which are associated with a common next hop port compete for transmission to that common next hop port, while packets belonging to an inactive micro-queue are not scheduled for transmission. Packets belonging to inactive micro-queues can only be scheduled for transmission to the appropriate next hop port once their micro-queues become active.

In order to assist in efficient implementation of a scheduling algorithm, it is within the scope of the present invention to keep an updated list of the active micro-queues for each next hop port (and, if applicable, for each service class) in a respective "queue of active micro-queues". Thus, the "queue of active micro-queues" for a given next hop port (and service class) contains an ordered set of flows for which packets can be scheduled for transmission to the given next hop port. Different "queues of active micro-queues", which are associated with the same next hop port but a different service class, compete for transmission to the same next hop port. This "queue of active micro-queues" structure allows the active flows to be searchable and more easily updated.

It should be understood that the scheduling functionality, heretofore described as being performed by the queue processor 220, may in the alternative be performed by a separate scheduling entity. It should also be noted that because only packets from the active micro-queues associated with a given next hop port are eligible for being scheduled for transmission to that next hop port, and since there are multiple micro-queues for each next hop port, it is possible that some micro-queues contain packets that are eligible for transmission to that next hop port, while other micro-queues associated with the same next hop port do not contain packets that are eligible for transmission to that next hop port. Advantageously, this feature allows some flows to be scheduled for transmission to a particular next hop port in a non-blocking way even though the particular next hop port might present blocking for other flows.

In addition, the queue processor 220 determines whether there is room for a scheduled packet in a next downstream entity 280. This can be achieved by consulting the value of a back-pressure signal present on a control link 276 that is supplied by the next downstream entity 280. In the case of congestion managers 34 in FIG. 1A, the next downstream entity 280 is an input port of the switch fabric 42; in the case of congestion managers 44 in FIG. 1A, the next downstream entity 280 is a port on one of the output line cards 62; in the case of congestion managers 34, 44 in FIG. 1B, the next downstream entity 280 is an input port of the switch fabric 72.

If the back-pressure signal indicates that there is room for a scheduled packet in the next downstream entity 280, the queue processor 220 proceeds to transmit the next scheduled packet. To this end, the queue processor 220 issues a read command and sends the read command to the packet memory 210 along a READ_CMD link 277. The read command transmitted in this fashion may simply identify the memory location of the packet to be read out of the packet memory 210. The packet memory 210 is therefore adapted to respond to the read command received via the READ_CMD link 277 by placing the required packet onto a DATA link 275 that leads to the next downstream entity 280. Additionally, the queue processor 220 is adapted to remove the packet so transmitted from the linked list of the appropriate micro-queue.

Of course, if there are two or more next hop ports for which at least one respective packet is scheduled, then the packets scheduled for transmission to different next hop ports will compete against one another for a spot in the next downstream entity. This competition can be resolved using arbitration algorithms commonly known to those of ordinary skill in the art.

At or around the same time a read command is being issued along the READ_CMD link 277, the queue processor 220 also issues a command along a MUC_DEC link 283, identifying the flow associated with the particular micro-queue from which the packet has just been removed. Thus, the signal on the MUC_DEC link 283, which leads to the controller 240, specifies a final hop port and, if applicable, a service class. This information is used by the controller 240 to update the memory utilization counters 250, as is now described.

The controller 240 receives information concerning the flow to which packets being written to and read out of the packet memory 210 belong. On the basis of this information, and on the basis of the information in the memory utilization counters 250, the controller 240 generates a signal indicative of memory occupancy. The memory occupancy message is transmitted to congestion managers located further upstream by way of an AE/AF_TX link 293. This generation of the memory occupancy message corresponds to step 501 of FIG. 2 and the transmission of the memory occupancy message corresponds to step 502 of FIG. 2.

It should be noted that by virtue of its participation in the flow management protocol with downstream congestion managers, the controller 240 also receives analogous memory occupancy information from such downstream congestion managers via an AE/AF_RX link 287. On the basis of the received memory occupancy message, the controller 240 generates queue activate/deactivate messages that are sent to the queue processor 220 via the QUEUE_INS/REM link 289. The activity of receiving the memory occupancy message corresponds to step 503 of FIG. 2 and the processing of the received memory occupancy message corresponds to step 504 of FIG. 2. (It is to be noted, for clarity, that the memory occupancy message received via the AE/AF_RX link 287 controls the activation/deactivation of micro-queues in the queue database 230, while the back-pressure signal on control link 276 controls the timing of transmissions from the packet memory 210.)

Figure 5:
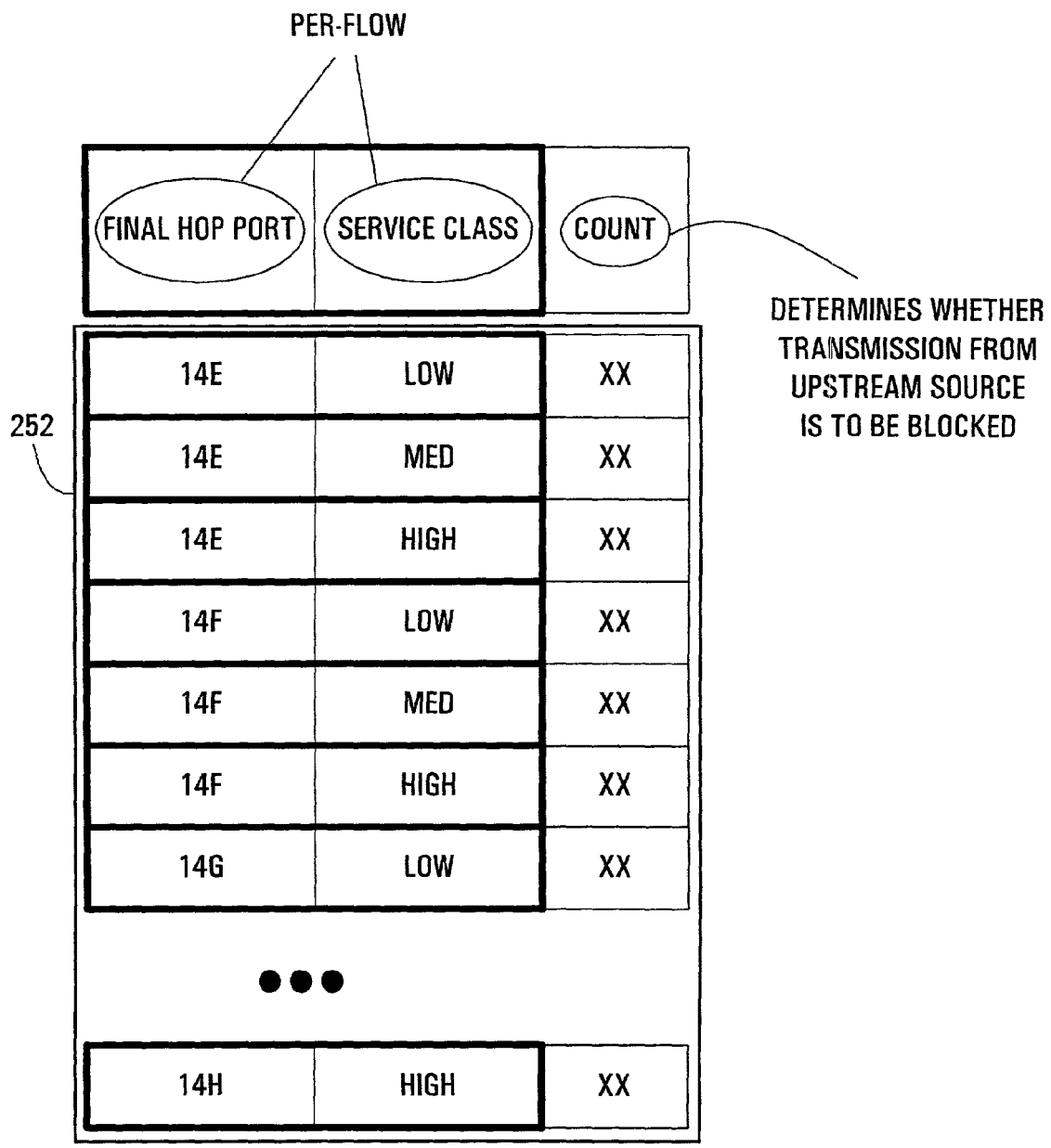
FIG. 5 illustrates one example of the way in which a memory utilisation database in the congestion manager of FIG. 3 can be organized.

In order to fully appreciate the manner in which the controller 240 decides whether to render active or inactive the state of individual micro-queues in response to receipt of a memory occupancy message, it may be beneficial to first describe the functionality of the controller 240 with regard to generation of such memory occupancy message. To this end, and with additional reference to FIG. 5, the memory utilization counters include a per-flow memory utilization counter database 252, which includes a set of counters that are arranged on the basis of flow. Thus, one counter exists for each combination of final hop port and, if applicable, service class. The value of the counter determines how occupied the flow is, regardless of the next hop port of each packet belonging to the flow. In this sense, the value of the counter associated with a particular flow is indicative of the aggregate occupancy of that flow at the congestion manager 200.

In the case of a highly occupied flow (high aggregate occupancy), upstream sources should be prevented from transmitting packets belonging to that flow which pass through the next hop port in question. Conversely, in the case of a flow associated with a very low aggregate occupancy, upstream sources should be informed that they are free to transmit packets belonging to that flow and passing through the next hop port in question. If the database 252 were located in one of the congestion managers 44 of FIG. 1A, then the upstream sources would be the congestion managers 34; if the database 252 were located in one of the congestion managers 34 of FIG. 1A, then the upstream sources would be the input line cards 22.

Figure 6A:
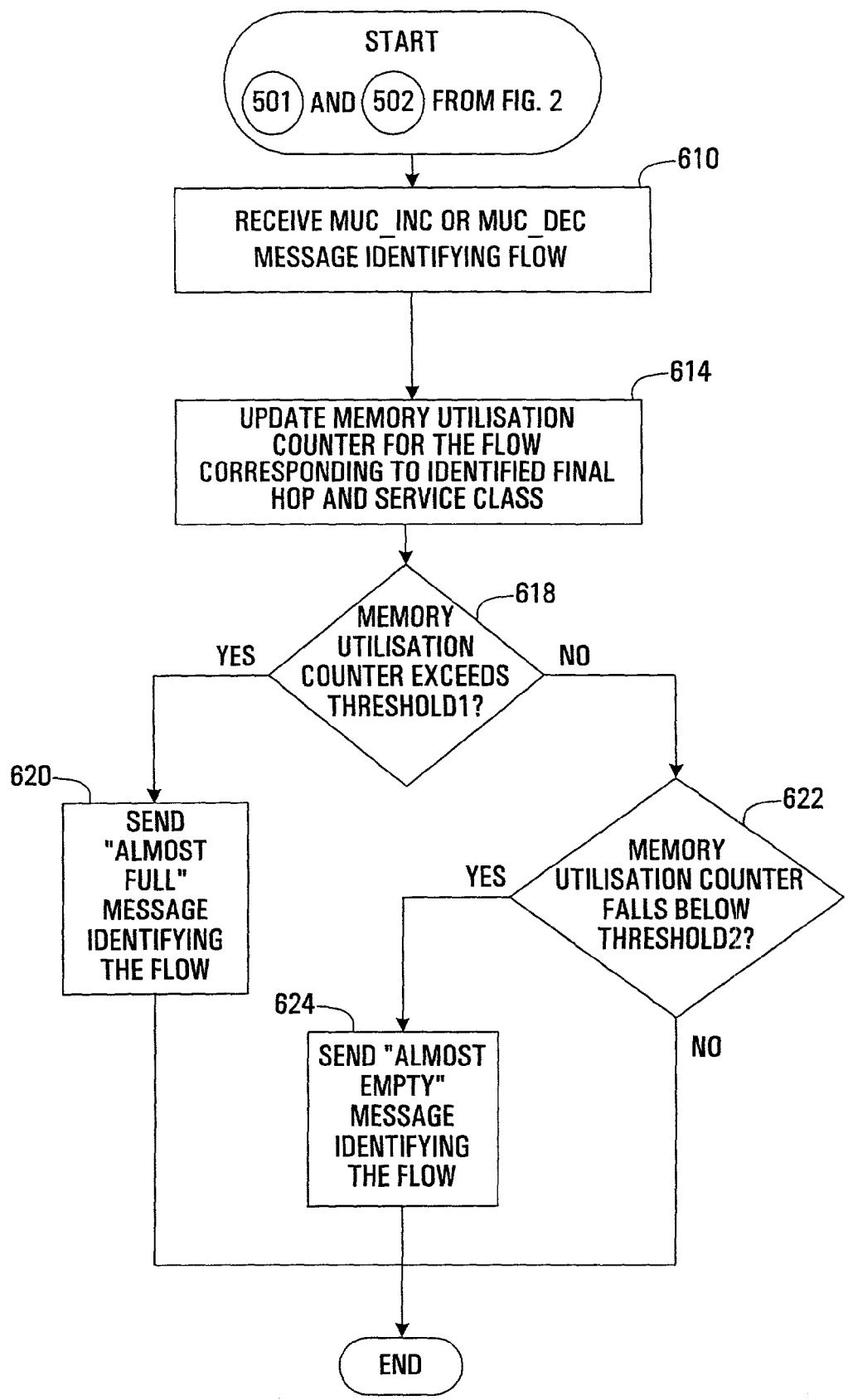
FIGS. 6A and 6B are flowcharts illustrating operational steps executed by a controller in the congestion manager of FIG. 3.

The manner in which the memory utilization counters in the database 252 are updated by the controller 240 is now described with additional reference to FIG. 6A. At step 610, the controller 240 receives a message on either the MUC_INC link 281 or the MUC_DEC link 283 specifying the identity of a flow. At step 614, the controller 240 performs an update of the appropriate memory utilization counter. Specifically, if the message was a message received along the MUC_INC link 281, then such message denotes a memory utilization increase and the controller 240 increments the appropriate memory utilization counter corresponding to that flow. On the other hand, if the message was received along the MUC_DEC link 283, then such message denotes a decrease in memory utilization and the controller 240 decrements the appropriate memory utilization counter corresponding to that flow.

At step 618, the controller 240 checks whether the memory utilization counter it has just updated has exceeded a pre-defined threshold, denoted threshold 1. If so, the controller proceeds to step 620, where an "almost full" message is generated and sent upstream. The "almost full" message so generated specifies the identity of the flow corresponding to the memory utilization counter that has exceeded threshold 1. This message, which is indicative of the congestion manager 200 not being able to accept any more packets associated with that flow, is sent upstream via the AE/AF_TX link 293, with the intention of preventing other packets with that flow from being sent to the congestion manager 200.

If, on the other hand, the memory utilization counter updated at step 614 has been found not to exceed threshold 1 at step 618, then the controller 240 proceeds to step 622, where the memory utilization counter is compared to threshold 2. If the memory utilization counter has fallen below threshold 2, then an "almost empty" message is generated and sent upstream via the AE/AF_TX link 293 as part of step 624. The "almost empty" message is indicative of the fact that there the congestion manager 200 would be able to handle a greater number of packets associated with the flow in question. If the memory utilization counter is neither above threshold 1 nor below threshold 2, then no specific action is taken by the congestion manager 200.

The "almost full" or "almost empty" message sent at step 620 or 624 is sent via the AE/AF_TX link 293 and may be broadcast to all of the congestion managers located at the previous switching stage. In other embodiments, the message will be sent only to those upstream congestion managers that have recently sent packets associated with the flow in question. In order to identify these upstream congestion managers, the controller 240 may maintain a database which indicates, for each upstream congestion manager, the flows for which packets belonging to that flow have been recently transmitted by that upstream congestion manager. In this case, the term "recently" may be on the order of "within the last few milliseconds". By transmitting the "almost full" or "almost empty" message for a given flow only to those upstream congestion managers that have recently sent packets associated with that flow, unnecessary bandwidth utilization may be reduced.

It should be understood that in some embodiments, the thresholds (i.e., threshold 1 and threshold 2) can be pre-determined. In other embodiments, the thresholds may be determined dynamically as a function of the total utilization of the packet memory 210. For example, if the total utilization of the packet memory 210 is relatively low, then thresholds 1 and 2 may be set higher than when the total utilization of the packet memory 210 is relatively high.

The congestion manager 200 can itself receive the same type of "almost full" or "almost empty" messages it generates. In other words, it is possible to explain the reaction of an upstream congestion manager to a memory occupancy message received from the congestion manager 200 by explaining the reaction of the congestion manager 200 itself to a memory occupancy message received along the AE/AF_RX link 287 from a downstream congestion manager located at a given next hop port.

Generally speaking, the controller 240 reacts to receipt of an "almost empty" message (which is received from the congestion manager located at a given next hop port and which specifies the identity of a given flow), by rendering "inactive" the state of the one micro-queue associated with the given flow and with the given next hop port. Similarly, the controller 240 reacts to receipt of an "almost full" message (received from the congestion manager located at a given next hop port and specifying the identity of a given flow) by rendering "active" the state of the one micro-queue associated with the given flow and with the given next hop port. It is recalled that only the packets in an active micro-queue can be scheduled for transmission to a next hop port.

This allows control to be exerted over which micro-queues are eligible to have their packets scheduled for transmission to a given next hop port. In particular, in terms of transmission to the given next hop port, micro-queues corresponding to a certain set of flows may be in an inactive state, while micro-queues corresponding to another set of flows will be in an inactive state (whereby the packets in the latter set of micro-queues are scheduled for transmission to the given next hop port). By the same token, for the same flow, micro-queues corresponding to a certain set of next hop ports may be inactive while micro-queues corresponding to another set of next hop ports will be active.

Figure 6B:
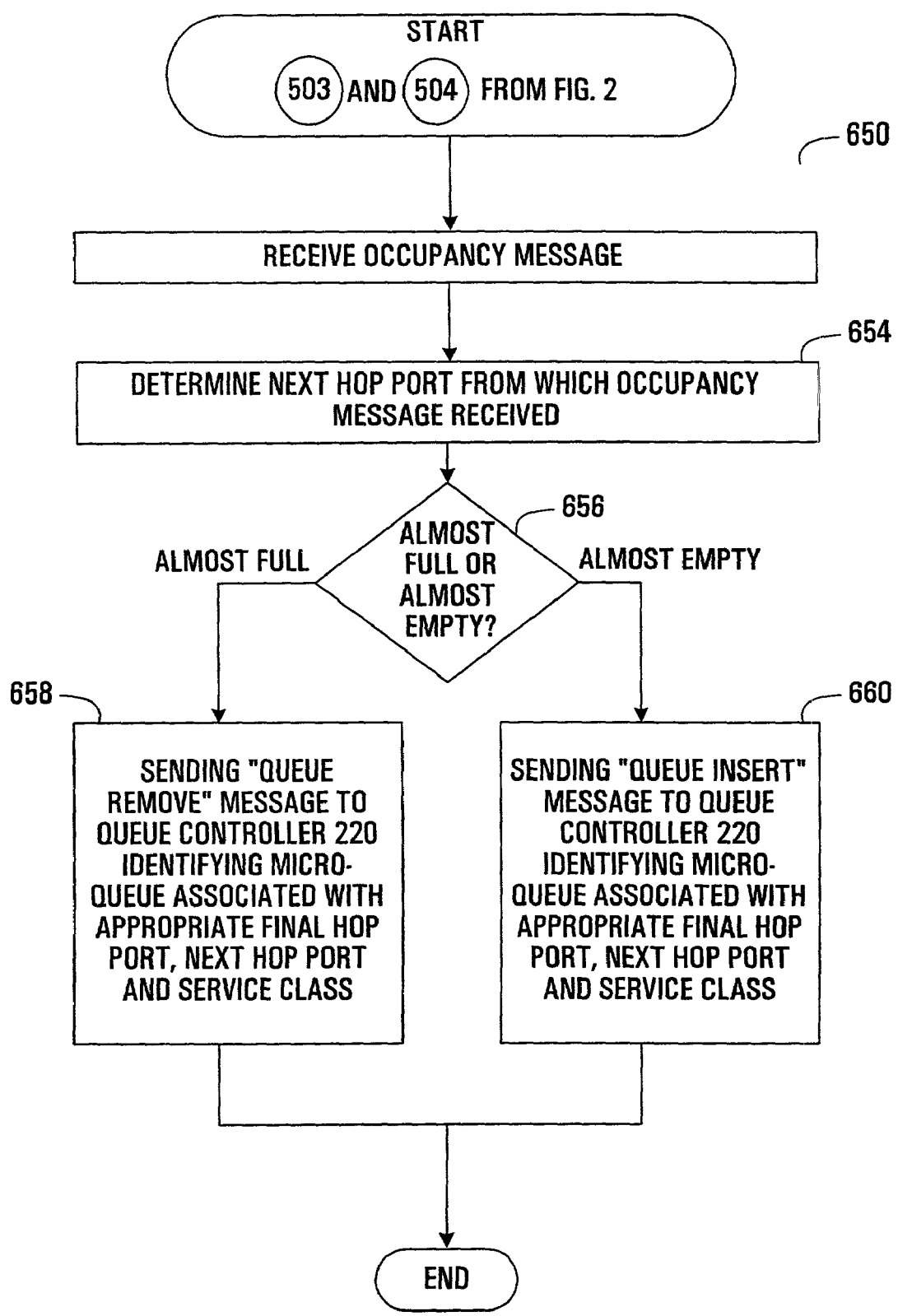

A more specific description of the operation of the controller 240 in response to receipt of a memory occupancy message from a congestion manager located at a particular next hop port is now provided with additional reference to FIG. 6B. At step 650, the controller 240 receives a memory occupancy message specifying a given flow along the AE/AF_RX link 287. The memory occupancy message may be an "almost empty" message or an "almost full" message. At step 654, the controller 240 determines the next hop port from which the memory occupancy message was received. At step 656, the controller 240 determines whether the received memory occupancy message is an "almost empty" message or an "almost full" message.

In the case of an "almost full" message, the controller 240 proceeds to step 658, where it responds by sending a "queue remove" message to the queue processor 220 along the QUEUE_INS/REM link 289. The "queue remove" message sent in this manner specifies the identity of the micro-queue which is to be deactivated. The micro-queue identified in this manner is the micro-queue associated with (i) the flow (final hop port and, if applicable, service class) specified in the received "almost full" message and (ii) the next hop port from which the "almost full" message was received. As previously described, the queue processor 220 responds by rendering inactive the state of the micro-queue in question, which temporarily disables the packets it is associated with from being scheduled for transmission to the next hop port.

If, on the other hand, step 656 reveals that the received message was an "almost empty" message, then the controller 240 proceeds to step 660, where it responds by sending a "queue insert" message to the queue processor 220 along the QUEUE_INS/REM link 289. The "queue insert" message sent in this manner specifies the identity of the micro-queue which is to be activated. The micro-queue identified in this manner is the micro-queue associated with (i) the flow (final hop port and service class) specified in the received "almost empty" message and (ii) the next hop port from which the "almost empty" message was received. As previously described, the queue processor 220 responds by rendering active the state of the micro-queue in question, which allows its packets to be scheduled for transmission to the appropriate next hop port.

The embodiments described herein above have assumed that a packet entering the router by one of its input ports exits the router by one of its output ports. However, the present invention is also applicable to scenarios in which a packet entering the router needs to be transmitted to multiple output ports (multicast) and also to the case where control packets enter the router or are generated by a switch fabric within the router.

Figure 7:
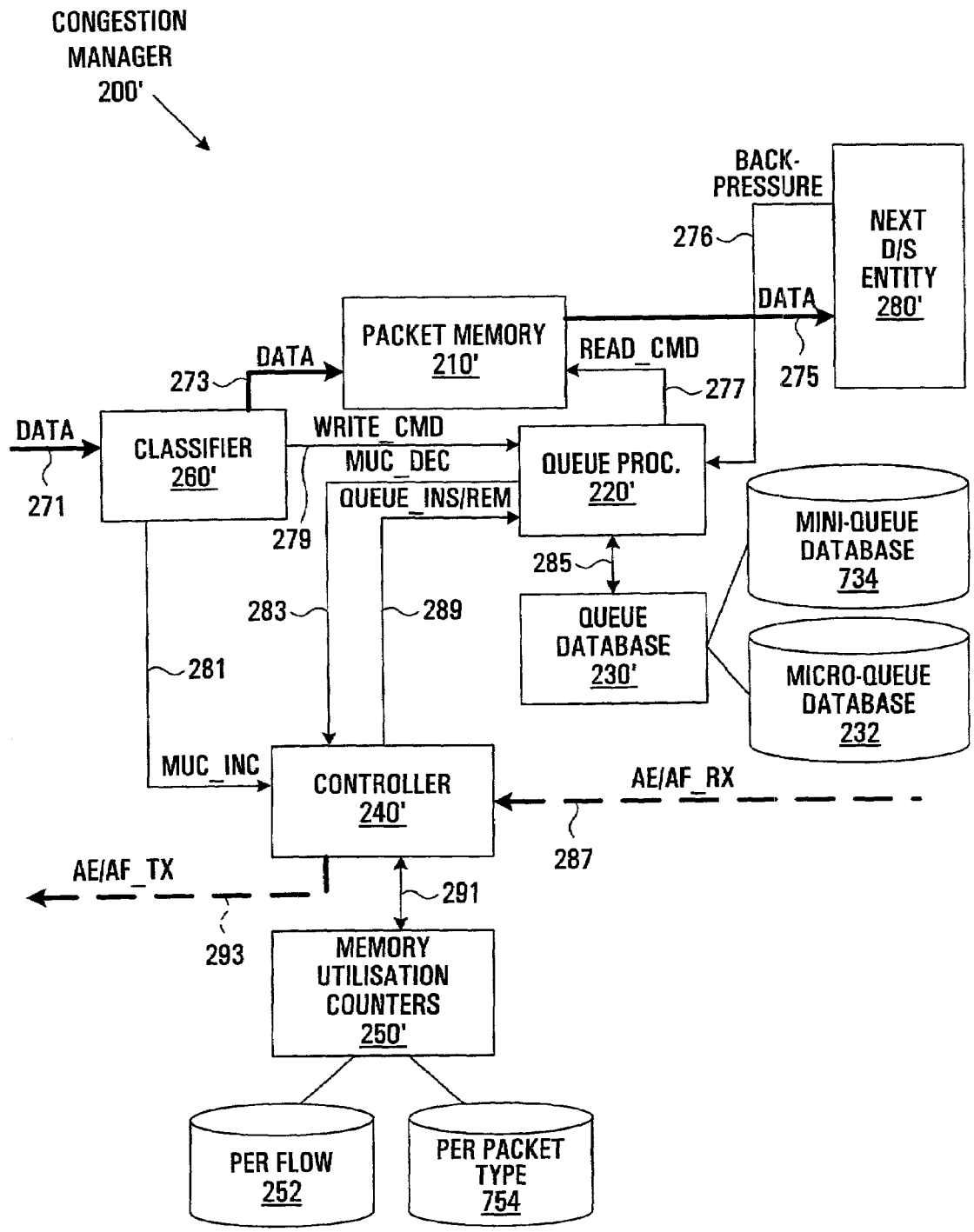
FIG. 7 is a block diagram of functional elements of a congestion manager such as one of the congestion managers of FIGS. 1A and 1B, according to another embodiment of the present invention.

An embodiment of the present invention which accommodates the transmission of multicast and control packets is now described with reference to FIGS. 7, 8, 9, 10A and 10B. As shown in FIG. 7, the congestion manager 200' includes a packet memory 210', a queue processor 220', a queue database 230', a controller 240', a set of memory utilization counters 250' and a classifier 260'. Packets entering the congestion manager 200' arrive at the classifier 260' via a DATA link 271. Each packet entering the classifier 260' is either a unicast packet (which specifies a single final hop port associated with that packet) or a multicast packet (which specifies a plurality of final hop ports associated with that packet) or a control packet (which specifies no final hop port). The manner in which the congestion manager 200' handles unicast packets is identical to that described previously with reference to the congestion manager 200 in FIG. 3. The following described the manner in which the congestion manager 200' handles multicast and control packets.

The classifier 260' comprises suitable circuitry, software and/or control logic for selecting the path that each received multicast/control packet will take, on the basis of the final hop port(s) and packet type, as well as on the basis of a set of paths found in a global address table and on the basis of link failure information. Examples of packet type include multicast high-priority packets, multicast medium-priority packets, multicast low-priority packets, congestion management packets (transmitted via the AE/AF_RX and AE/AF_TX lines 287, 293), and other control packets. If a packet is to be sent to multiple final destinations, the classifier 260' makes multiple copies of the packet and selects the path that each resulting packet will take.

The classifier 260' then sends each packet to the packet memory 210' along a DATA link 273. At or around the same time, the classifier 260' issues a write command to the queue processor 220' along a WRITE_CMD link 279. The write command on the WRITE_CMD link 279 instructs the queue processor 220' to write the packet presently on the DATA link 273 somewhere in the packet memory 210'. The write command specifies the packet type of the packet to be written into the packet memory 210'. Meanwhile, the packet type is also provided to the controller 240' via a MUC_INC link 281. As will be seen later on with regard to the memory utilization counters 250', the packet type information on the MUC_INC link 281 is used by the controller 240' to update the memory utilization counters 250'.

The queue processor 220' manages the queue database 230', to which it is connected via an access link 285. The queue database 230' includes a micro-queue database 232

(previously described with respect to FIG. 4) and a mini-queue database 734, conceptually illustrated in FIG. 8. It is seen that there is one mini-queue defined for each combination of final hop port and packet type. Each mini-queue so defined is associated with a linked list of, or pointer to, addresses in the packet memory 210' which correspond to that mini-queue. A packet is added to the linked list of a particular mini-queue by virtue of a write command being received from the classifier 260' along on the WRITE_CMD link 279. It is recalled that the write command specifies the packet type of the packet to be written into the packet memory 210'.

It should be noted that each mini-queue may be either "active" or "inactive" at a given time, depending on conditions affecting the final hop port or packet type that define the mini-queue in question. An active mini-queue is a mini-queue whose packets can be scheduled for transmission without the risk of being blocked, while an inactive mini-queue is associated with packets that cannot be scheduled without risk of being blocked. The controller 240' may render a mini-queue active or inactive by issuing a command which is received by the queue processor 220' along a QUEUE_INS/REM link 289.

Furthermore, the queue processor 220' includes circuitry, software and/or control logic for performing scheduling of packets in the active mini-queues. For multicast/control packets, such scheduling is performed independently for each final hop port. Thus, packets belonging to active mini-queues which are associated with a common final hop port compete for transmission to that final hop port, while packets belonging to an inactive mini-queue are not scheduled for transmission at all. Such competition can be resolved using arbitration algorithms commonly known to those of ordinary skill in the art. Packets belonging to inactive mini-queues can only be scheduled for transmission to the appropriate next hop port once their mini-queues become active.

In addition, the queue processor 220' determines whether there is room for a scheduled packet in a next downstream entity 280. As with the queue processor 220 in FIG. 3, this can be achieved by consulting the value of a back-pressure signal present on a control link 276 that is supplied by the next downstream entity 280. If the back-pressure signal indicates that there is room for a scheduled packet in the next downstream entity 280, the queue processor 220' proceeds to transmit the next scheduled packet.

To this end, the queue processor 220' issues a read command and sends the read command to the packet memory 210' along a READ_CMD link 277. The read command transmitted in this fashion may simply identify the memory location of the packet to be read out of the packet memory 210'. The packet memory 210' is therefore adapted to respond to the read command received via the READ_CMD link 277 by placing the required packet onto a DATA link 275 that leads to the next downstream entity 280. Additionally, the queue processor 220' is adapted to remove the packet so transmitted from the linked list of the appropriate mini-queue.

At or around the same time a read command is being issued along the READ_CMD link 277, the queue processor 220' also issues a command along a MUC_DEC link 283, identifying the final hop port and packet type associated with the particular mini-queue from which the packet has just been removed. Thus, the signal on the MUC_DEC link 283, which leads to the controller 240', specifies a final hop port and a packet type. This information is used by the controller 240' to update the memory utilization counters 250', as is now described. On the basis of the information in the memory utilization counters 250', the controller 240' generates a signal indicative of memory occupancy. The memory occupancy message is transmitted to congestion managers located further upstream by way of an AE/AF_TX link 293.

Figure 9:
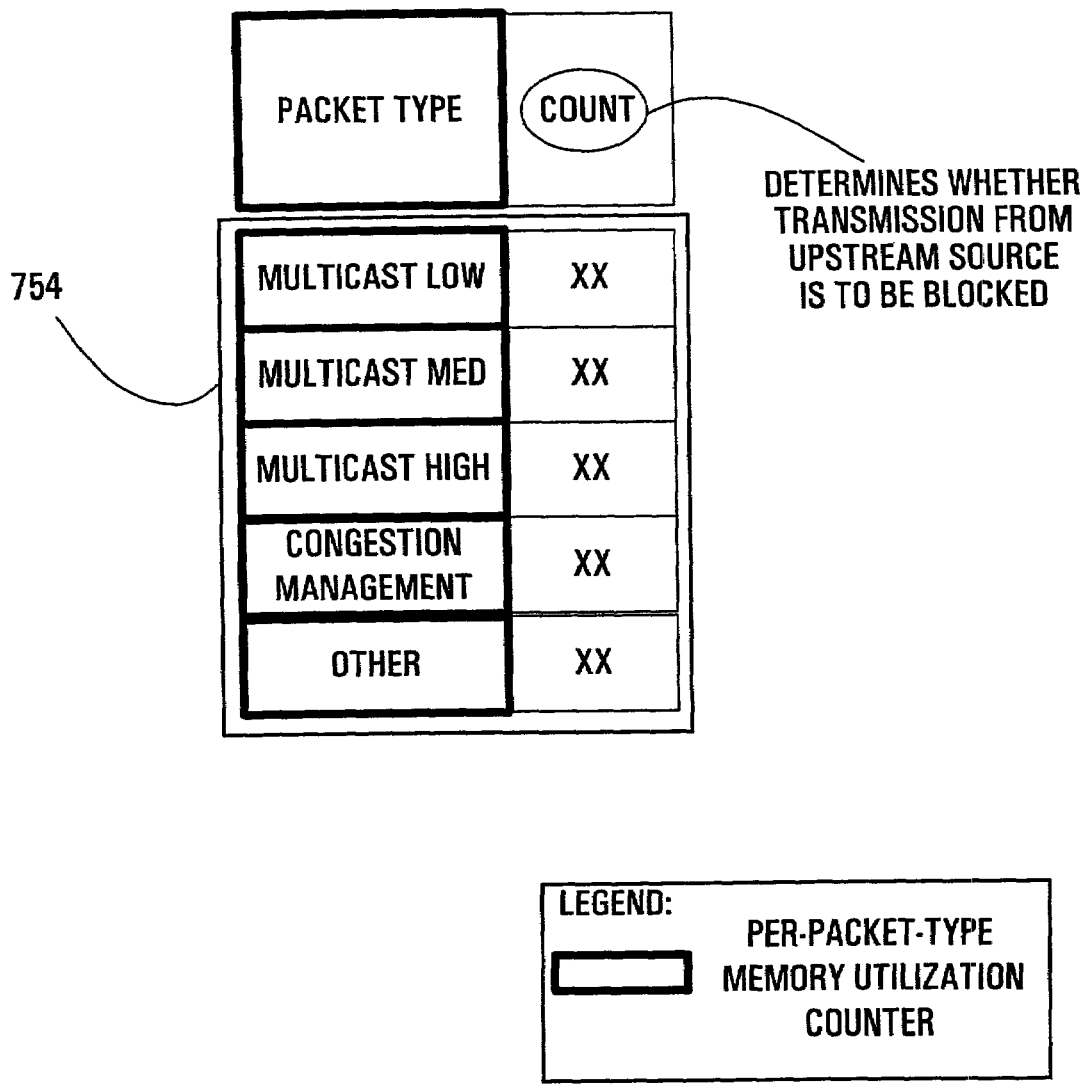
FIG. 9 illustrates one example of the way in which a portion of the memory utilisation database in the congestion manager of FIG. 7 can be organized.
Figure 10A:
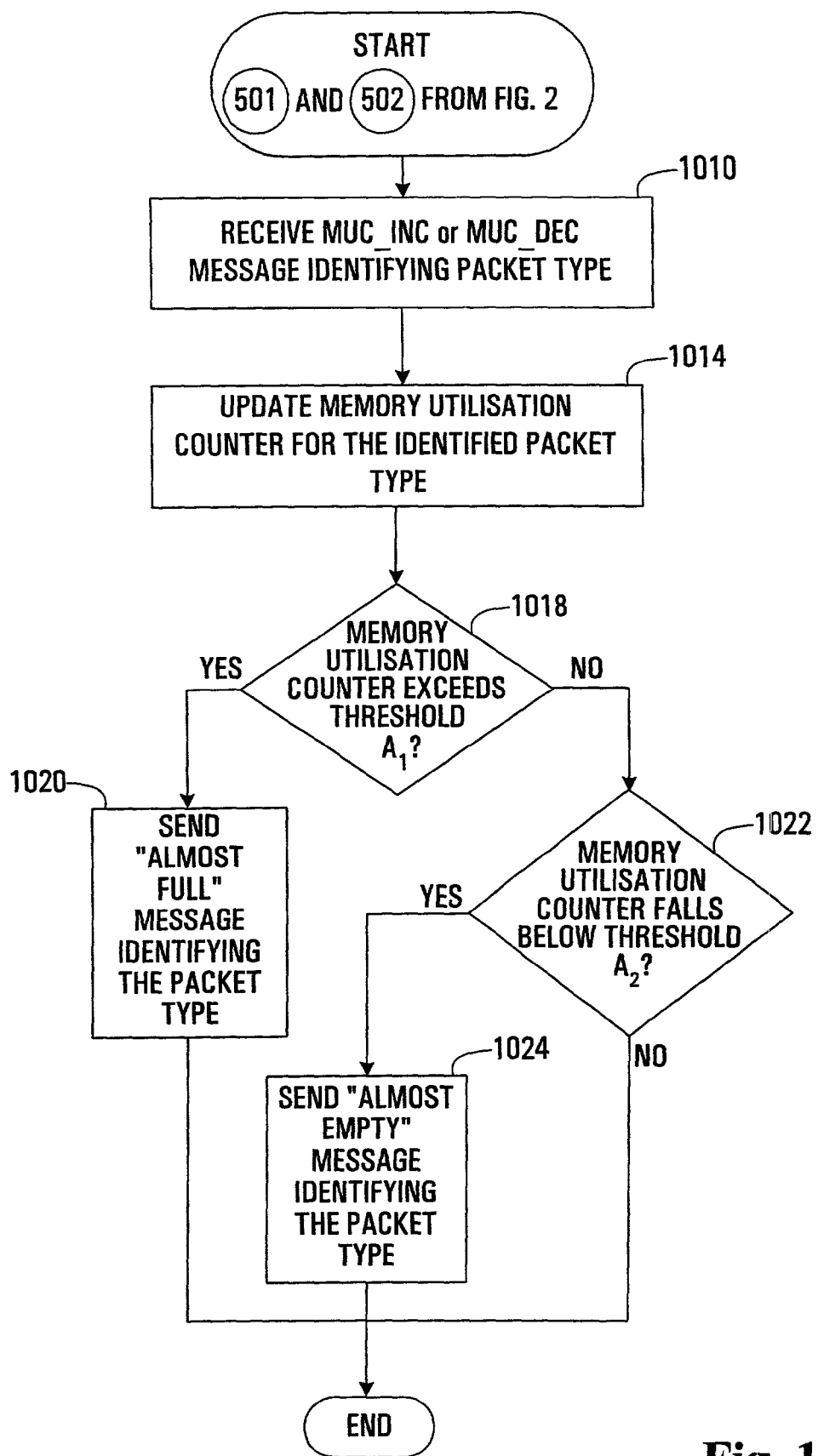
FIGS. 10A and 10B are flowcharts illustrating operational steps executed by a controller in the congestion manager of FIG. 7.
Figure 10B:
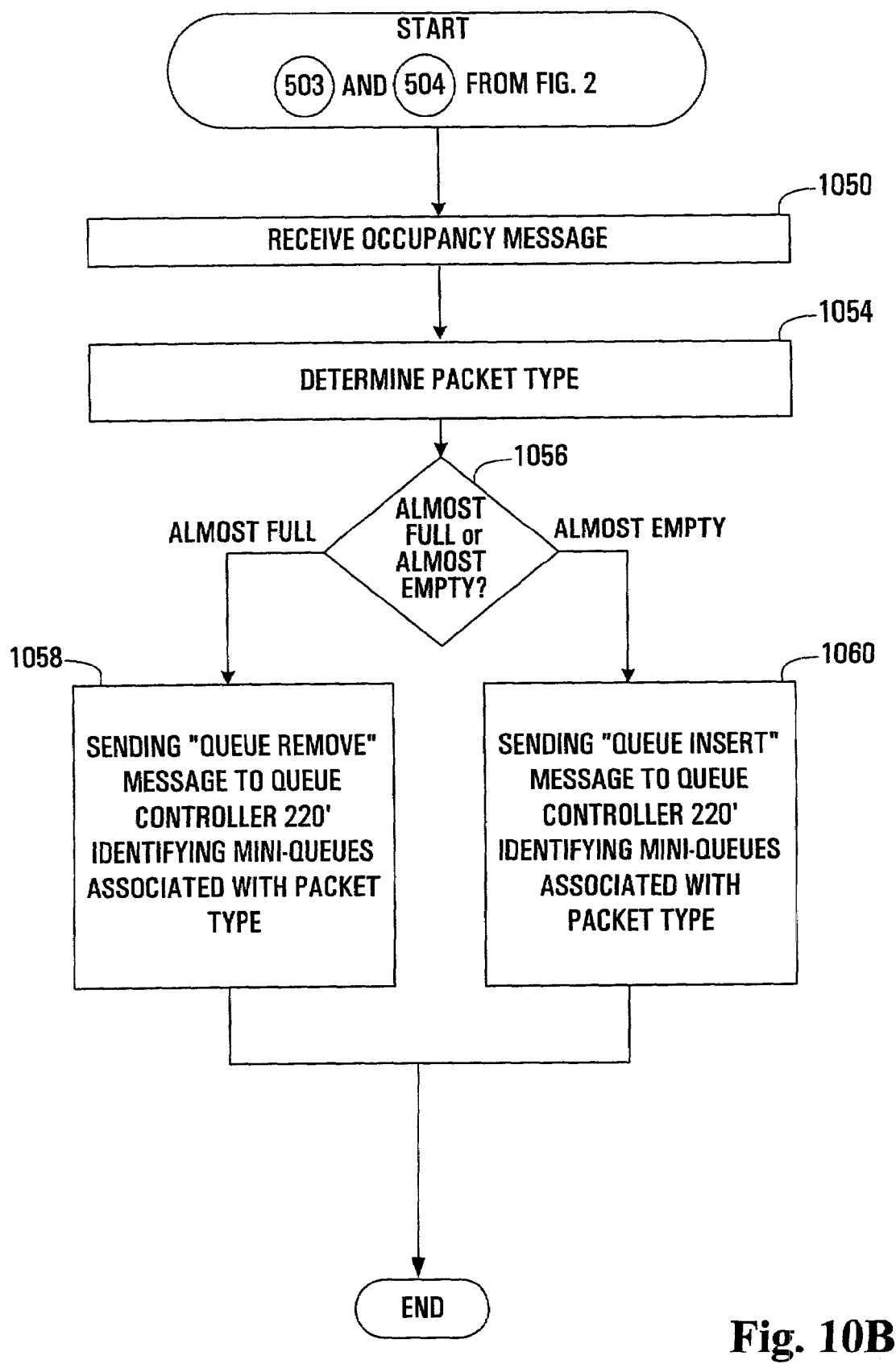

The functionality of the controller 240' with regard to generation of such memory occupancy message is now described with additional reference to FIG. 9. Specifically, the memory utilization counters 250' include a per-flow memory utilization counter database 252 (previously described with reference to FIG. 5) and a per-packet-type memory utilization counter database 754 (shown conceptually in FIG. 9). In the per-packet-type memory utilization counter database 754, there is provided a set of counters that are arranged on the basis of packet type. The value of the counter associated with a particular packet type indicates the extent to which the bandwidth for packets of that type is being utilized within the congestion manager 200'.

In the case of a highly utilized packet type, upstream sources should be prevented from transmitting packets of that type to the congestion manager 200'. Conversely, in the case of an under-utilized packet type, upstream sources should be informed that they are free to transmit packets of that type to the congestion manager 200'. To this end, the manner in which the memory utilization counters in the database 754 are updated by the controller 240' is now described with additional reference to FIG. 10A. The following description is valid for multicast and control packets, the situation for unicast packets having been described previously with respect to FIGS. 6A and 6B.

At step 1010, the controller 240' receives a message on either the MUC_INC link 281 or the MUC_DEC link 283 specifying a packet type. At step 1014, the controller 240' performs an update of the appropriate memory utilization counter. Specifically, if the message was a message received along the MUC_INC link 281, then such message denotes a memory utilization increase and the controller 240' increments the appropriate memory utilization counter corresponding to the specified packet type. On the other hand, if the message was received along the MUC_DEC link 283, then such message denotes a decrease in memory utilization and the controller 240' decrements the appropriate memory utilization counter corresponding to the specified packet type.

At step 1018, the controller 240 checks whether the memory utilization counter it has just updated has exceeded a pre-defined threshold, denoted threshold $A_1$. If so, the controller proceeds to step 1020, where an "almost full" message is generated and sent upstream. The "almost full" message so generated specifies the identity of the packet type corresponding to the memory utilization counter that has exceeded threshold $A_1$. This message, which is indicative of the congestion manager 200' not being able to accept any more packets associated with that packet type, is sent upstream via the AE/AF_TX link 293, with the intention of preventing other packets with that flow from being sent to the congestion manager 200.

If, on the other hand, the memory utilization counter updated at step 1014 has been found not to exceed threshold $A_1$ at step 1018, then the controller 240' proceeds to step 1022, where the memory utilization counter is compared to threshold $A_2$. If the memory utilization counter has fallen below threshold $A_2$, then an "almost empty" message is generated and sent upstream via the AE/AF_TX link 293. The "almost empty" message is indicative of the fact that there the congestion manager 200' would be able to handle a greater number of packets associated with the packet type in question. If the memory utilization counter is neither above threshold $A_1$ nor below threshold $A_2$, then no specific action is taken by the congestion manager 200'.

It should be noted that by virtue of its participation in the flow management protocol with downstream congestion managers, the controller 240' also receives analogous memory occupancy information from such downstream congestion managers via an AE/AF_RX link 287. On the basis of the received memory occupancy message, the controller 240' generates queue activate/deactivate messages that are sent to the queue processor 220' via the QUEUE_INS/REM link 289.

Generally speaking, the controller 240' reacts to receipt of an "almost empty" message (which is received from the congestion manager located at a given next hop port and which specifies the identity of a given packet type), by rendering "inactive" the state of all mini-queues associated with the given packet type. Similarly, the controller 240 reacts to receipt of an "almost full" message (received from the congestion manager located at a given next hop port and specifying the identity of a given flow) by rendering "active" the state of all mini-queues associated with the given packet type. This will affect which packet is the next one to be scheduled for eventual transmission to a given final hop port. In particular, some mini-queues corresponding to a certain final hop port may be in an active state, while other mini-queues corresponding to that same final hop port will be in an inactive state A more specific description of the operation of the controller 240' in response to receipt of a memory occupancy message from a downstream congestion manager is now provided with additional reference to FIG. 10B. At step 1050, the controller 240' receives a memory occupancy message specifying a given packet type along the AE/AF_RX link 287. The memory occupancy message may be an "almost empty" message or an "almost full" message. At step 1056, the controller 240 determines whether the received memory occupancy message is an "almost empty" message or an "almost full" message.

In the case of an "almost full" message, the controller 240' proceeds to step 1058, where it responds by sending a "queue remove" message to the queue processor 220 along the QUEUE_INS/REM link 289. The "queue remove" message sent in this manner specifies the identity of the mini-queues to be deactivated, i.e., the mini-queues associated with the packet type specified in the received "almost full" message. The queue processor 220' responds by rendering inactive the state of the mini-queues in question, which temporarily disables the packets they is associated with from being scheduled for transmission to the next hop port.

If, on the other hand, step 1056 reveals that the received message was an "almost empty" message, then the controller 240' proceeds to step 1060, where it responds by sending a "queue insert" message to the queue processor 220' along the QUEUE_INS/REM link 289. The "queue insert" message sent in this manner specifies the identity of the mini-queues which is to be activated, namely, the mini-queues associated with the packet type specified in the received "almost empty" message. The queue processor 220' responds by rendering active the state of the mini-queues in question, which allows their packets to be scheduled for transmission to the appropriate next hop port.

In some embodiments, it may be advantageous to ensure non-blocking functionality of the router by ensuring that "almost full" memory occupancy messages sent by a downstream congestion manager are properly handled by an upstream stage of switching (e.g., by the congestion managers at the upstream stage of switching). To this end, the controller 240 or 240' may maintain a "tolerance counter" that is defined for memory utilization counter in the per-flow memory utilization counter database 252. The tolerance counter for a given flow is reset whenever an almost full message is sent upstream, which identifies the given flow. As packets belonging to the given flow are received (which is learned via the MUC_INC link 281), the tolerance counter for the given flow is incremented.

Because of the latency existing between the upstream switching stage and the controller 240, the packets belonging to the given flow will inevitably still continue to arrive and the tolerance counter will continue to be incremented for some time. However, at some point, the previously transmitted almost full message should take effect and the tolerance counter should stop incrementing. Thus, it is possible to identify a maximum value of the tolerance counter (as a function of the latency between the previous switching stage and the present one) which, if exceeded, is indicative of a situation in which the previously transmitted almost full message has not been properly received by the previous switching stage. This information may be used to re-issue an almost full message to the upstream switching stage. As a further refinement of this feature, if the tolerance counter is found to exceed a second maximum value, higher than the first, then an alarm may be signaled to an OAM unit (not shown) of the router 100.

Figure 11:
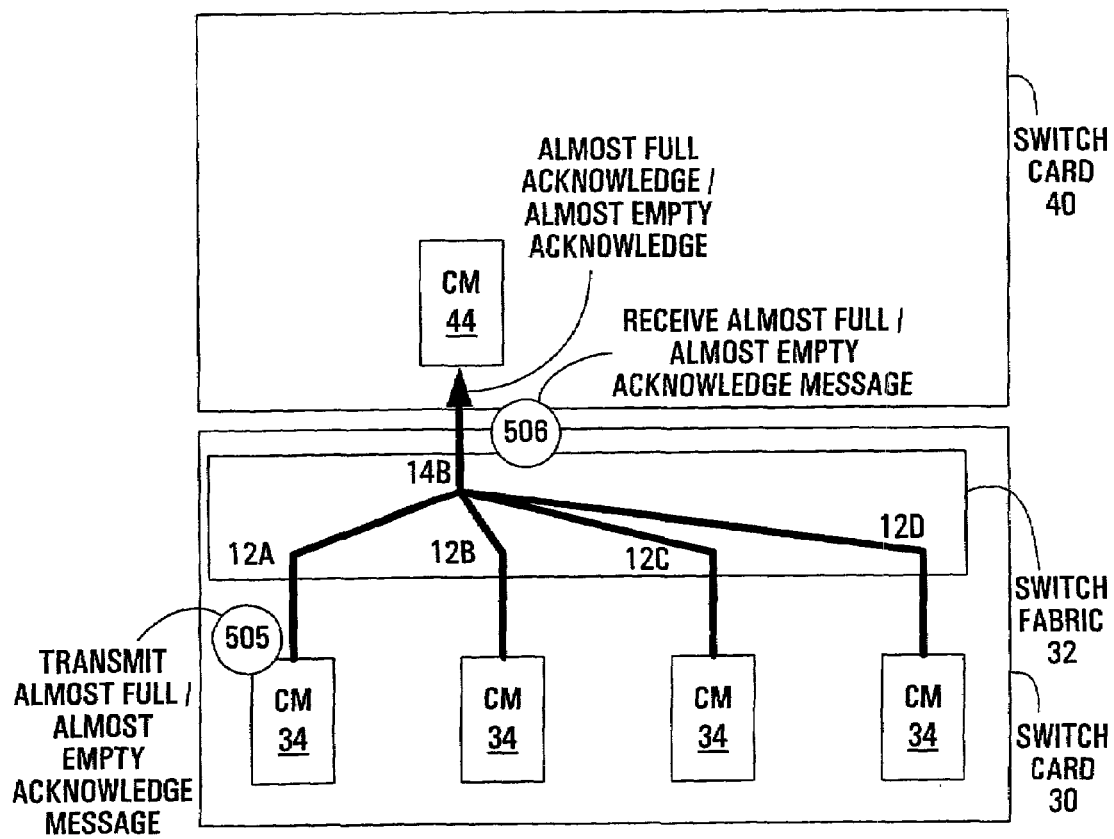
FIG. 11 is a signal flow diagram illustrating transmission and reception by the congestion managers of FIG. 1A of a message acknowledging the memory occupancy message of FIG. 2.

In still other embodiments, it may be advantageous to ensure that all memory occupancy messages exchanged by the congestion managers are safely received so that the appropriate actions are always taken. To this end, FIG. 11 shows a diagram illustrating a sequence of steps involved in formally acknowledging receipt of a memory occupancy message, be it an "almost full" message or an "almost empty" message. This diagram may be viewed as a continuation of FIG. 2, which illustrated a sequence of steps 501–504 involved in generating and receiving a memory occupancy message as part of an example flow management protocol.

At step 505, each upstream congestion manager 34 that has received a memory occupancy message from the downstream congestion manager 44 generates a memory occupancy acknowledge message which is returned to the congestion manager 44. The memory occupancy acknowledge message is indicative of whether it is a response to an "almost empty" occupancy message or an "almost full" occupancy message. In addition, the memory occupancy acknowledge message contains sufficient information to allow the downstream congestion manager 44 to update an "acknowledgement database" (to be described later); to this end, the acknowledge message indicates the flow relevant to the memory occupancy message, as well as the identity of the downstream congestion manager 44 having issued the memory occupancy message and the identity of the congestion manager 34 generating the memory occupancy acknowledge message. At step 506, the downstream congestion manager 44 receives the memory occupancy acknowledge message and updates its acknowledgement database.

Figure 12:
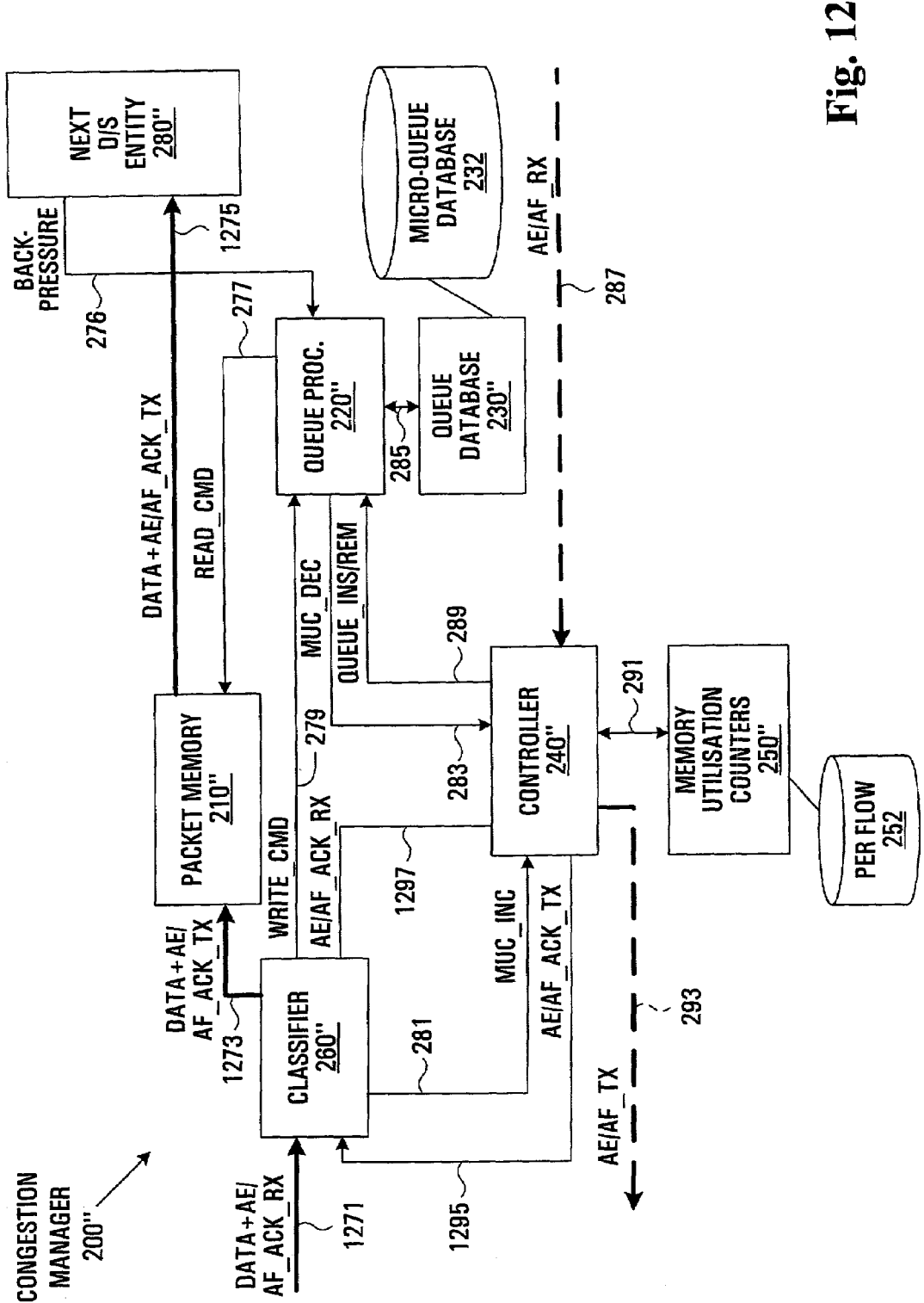
FIG. 12 is a block diagram of one of a congestion manager such as one of the congestion managers of FIGS. 1A and 1B, according to an embodiment of the present invention with the functionality to acknowledge receipt of memory occupancy messages.

FIG. 12 provides more details of an embodiment of a congestion manager 200" similar to the congestion manager 200 but with the additional functionality of being able to acknowledge the receipt of a memory occupancy message from a downstream congestion manager and also equipped with the additional functionality of monitoring acknowledgements made by upstream congestion managers in response to memory occupancy messages sent by the congestion manager 200" itself. The structure and operation of the congestion manager 200" will be described with reference to a unicast data packet transmission scenario but it should be appreciated that an extension to multicast data packet transmission is within the scope of the present invention.

As shown in FIG. 12, the congestion manager 200" includes a packet memory 210", a queue processor 220", a queue database 230, a controller 240", a set of memory utilization counters 250 and a classifier 260". Packets entering the congestion manager 200" from an upstream entity arrive at the classifier 260" via a link 1271, denoted DATA+AE/AF_ACK_RX. These packets include unicast data packets (denoted DATA) and received occupancy acknowledge messages (denoted AE/AF_ACK_RX). Each data packet entering the classifier 260 via link 1271 specifies a final hop port associated with that packet. Each received occupancy acknowledge message entering the classifier 260 via link specifies, in addition to the identity of a flow and the identity of a congestion manager (which may or may not be the congestion manager 200"), whether the occupancy message being acknowledged is an almost empty or almost full message.

Packets may also enter the classifier 260" from within the congestion manager 200", more specifically, from the controller 240" via a link 1295 denoted AE/AF_ACK_TX.

Such packets include transmitted occupancy acknowledge messages, which are generated by the controller 240" in response to receipt of occupancy messages from the next downstream entity 280. A transmitted occupancy acknowledge message will specify the identity of a flow and the identity of a congestion manager, as well as whether the occupancy message being acknowledged is an almost empty or almost full message. The congestion manager identified in a transmitted occupancy acknowledge message is downstream from the congestion manager 200".

The classifier 260" comprises suitable circuitry, software and/or control logic for selecting the path that each received packet will take. In the case of a data packet received via link 1271, the classifier 260" makes this selection on the basis of the flow (the final hop port and, if appropriate, the service class) of the packet, as well as on the basis of a set of paths found in a global address table and on the basis of link failure information. Thus, the classifier 260" determines the next hop port of each received data packet and may insert this information into the header of the data packet. Once the classifier 260" determines the next hop port of a data packet, the packet is sent to the packet memory 210" along a link 1273 denoted DATA+AE/AF_ACK_TX.

In the case of a received occupancy acknowledge message received via link 1271, the classifier 260" determines whether the congestion manager specified in the message is the congestion manager 200". If this is not the case, then no action is taken. However, if it is true that the congestion manager specified in the received occupancy acknowledge message is the congestion manager 200", then the message is forwarded to the controller 240" along a link 1297, denoted AE/AF_ACK_RX. Further action with respect to the received occupancy acknowledge message is taken in the controller 240". Finally, in the case of a transmitted occupancy acknowledge message received from the controller 240" via link 1295, the classifier 260" sends the message to the packet memory 210" along link 1273.

At or around the same time as the classifier 260" sends a data packet or an occupancy acknowledge message to the packet memory 210", the classifier 260" also issues a write command to the queue processor 220" along a WRITE_CMD link 279. The write command on the WRITE_CMD link 279 instructs the queue processor 220" to write the packet presently on the DATA+AE/AF_ACK_TX link 1273 somewhere in the packet memory 210".

In the case of a data packet, the write command specifies the flow to which the packet belongs, as well as the next hop port to which the packet is to be sent. Meanwhile, the identity of the flow to which the packet belongs is provided to the controller 240" via a MUC_INC link 281. As previously described with reference to FIG. 2, the flow information on the MUC_INC link 281 is used by the controller 240 to update the memory utilization counters 250. In the case of a transmitted occupancy acknowledge message, the write command sent along link 279 need not indicate any special information, as the destination and other relevant parameters of the transmitted occupancy acknowledge message are already encoded in the message itself.

The queue processor 220" manages the queue database 230 in the previously described manner. The queue processor 220" includes circuitry, software and/or control logic for performing scheduling of data packets in the active micro-queues 232 in the queue database 230. Such scheduling is performed on a per-next-hop-port basis, which means independently for each set of micro-queues corresponding to a given next hop port. In addition, the scheduling performed by the queue processor 220" takes into account the transmitted occupancy acknowledge messages, which are broadcast to all of the next hop ports.

Additionally, the queue processor 220" determines whether there is room for a scheduled packet in a next downstream entity 280. This can be achieved by consulting the value of a back-pressure signal present on a control link 276 that is supplied by the next downstream entity 280. If the back-pressure signal indicates that there is room for a scheduled packet in the next downstream entity 280, the queue processor 220" proceeds to transmit the next scheduled packet. To this end, the queue processor 220" issues a read command and sends the read command to the packet memory 210 along a READ_CMD link 277.

The read command transmitted in this fashion may simply identify the memory location of the packet to be read out of the packet memory 210. This may be a data packet or a packet forming part of a transmitted occupancy acknowledge message. The packet memory 210" is adapted to respond to the read command received via the READ_CMD link 277 by placing the required packet onto a DATA+AE/AF_ACK_TX link 1275 that leads to the next downstream entity 280. In the case of a data packet, the queue processor 220" is adapted to remove the identity of the transmitted data packet from the linked list of the appropriate micro-queue in the micro-queue database 232.

In the case of a data packet, the queue processor 220" issues a command along a MUC_DEC link 283 at or around the same time a read command is being issued along the READ_CMD link 277. As previously described, the command sent along the MUC_DEC link 283 identifies the flow associated with the particular micro-queue from which the data packet has just been removed. Thus, the signal on the MUC_DEC link 283, which leads to the controller 240, specifies a final hop port and, if applicable, a service class. This information is used by the controller 240" to update the memory utilization counters 250.

Specifically, the controller 240" receives information concerning the flows to which belong the data packets being written to (link 281) and read out (link 283) of the packet memory 210. On the basis of this information, and on the basis of the information in the memory utilization counters 250, the controller 240" generates a message indicative of memory occupancy. This has been described previously with reference to FIG. 6A. The memory occupancy message is transmitted to congestion managers located further upstream by way of an AE/AF_TX link 293.

Figure 13:
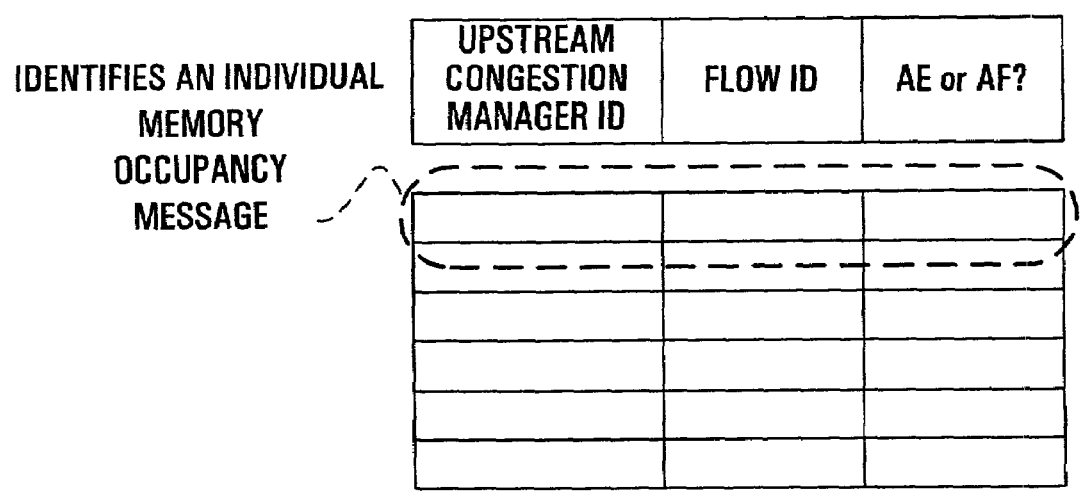
FIG. 13 illustrates one possible format of an acknowledgement database, in accordance with an embodiment of the present invention.

In addition, the controller 240" receives memory occupancy acknowledge messages from the classifier 260" via the AE/AF_ACK_RX link 1297. The memory occupancy acknowledge messages are in fact responses to "almost empty" and "almost full" occupancy messages previously generated by the controller 240". Each memory occupancy acknowledge message contains sufficient information to allow the controller 240" to update an acknowledgement database which, in one example embodiment, may take on the tabular form shown in FIG. 13. Specifically, previously transmitted and unacknowledged memory occupancy messages are identified by upstream congestion manager, flow and message type. Thus, a first column is provided for the identity of the upstream congestion manager to which the message was broadcast, a second column is provided for the identity of the flow (final hop port and, if applicable, service class) and a third column is provided for the message type (almost empty or almost full).

When a memory occupancy acknowledge message is received from the classifier, it is already known that the message is intended for the congestion manager 200". At this point, the controller 240" extracts the identity of the upstream congestion manager having transmitted the message, as well as the identity of the flow associated with the message and the message type (almost empty or almost full). Once the relevant information has been determined, the corresponding memory occupancy message is removed from the database of unacknowledged memory occupancy messages. In this way, non-acknowledgement of memory occupancy messages can be monitored and timely activating and deactivating of micro-queues by upstream congestion managers can be ensured.

Moreover, by virtue of its participation in the flow management protocol, the controller 240" also receives memory occupancy messages from downstream congestion managers via an AE/AF_RX link 287. On the basis of each received memory occupancy message, the controller 240" generates queue activate/deactivate messages that are sent to the queue processor 220" via the QUEUE_INS/REM link 289. This has been described previously with reference to FIG. 6B. Additionally, the controller 240" responds to receipt of a memory occupancy message by generating a memory occupancy acknowledge message, which is transmitted to the originating congestion manager via the AE/AF_ACK_TX link 1295 and the classifier 260".

The memory occupancy acknowledge message contains sufficient information to allow the downstream congestion manager to update its acknowledgement database. Thus, the memory occupancy acknowledge message is indicative of (i) the identity of the congestion manager 200"; (ii) the flow associated with the occupancy message to which it is responding; and (iii) the message type of the occupancy message to which it is responding (almost empty or almost full). It should be understood that in an alternative embodiment of the present invention, each memory occupancy message may be identified by a unique code, which would simply be returned by the memory occupancy acknowledge message when generated. In this way, it is no longer required to specifically identify the type or flow of the occupancy message which is being acknowledged.

Those skilled in the art should appreciate that in some embodiments of the invention, all or part of the functionality previously described herein with respect to the congestion managers 34, 44, 200, 1200 may be implemented as pre-programmed hardware or firmware elements (e.g., application specific integrated circuits (ASICs), electrically erasable programmable read-only memories (EEPROMs), etc.), or other related components.

In other embodiments of the invention, all or part of the functionality previously described herein with respect to the congestion managers 34, 44, 200, 1200 may be implemented as software consisting of a series of instructions for execution by a computer system. The series of instructions could be stored on a medium which is fixed, tangible and readable directly by the computer system, (e.g., removable diskette, CD-ROM, ROM, or fixed disk), or the instructions could be stored remotely but transmittable to the computer system via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should further appreciate that the series of instructions may be written in a number of programming languages for use with many computer architectures or operating systems. For example, some embodiments may be implemented in a procedural programming language (e.g., "C") or an object oriented programming language (e.g., "C++" or "JAVA").

While specific embodiments of the present invention have been described and illustrated, it will be apparent to those skilled in the art that numerous modifications and variations can be made without departing from the scope of the invention as defined in the appended claims.

We claim:

1. A method of regulating packet flow to a downstream entity capable of forwarding packets to a plurality of intermediate destinations, the method comprising:

maintaining a database of queues, each queue in the database being associated with packets intended to be forwarded to a corresponding one of a plurality of final destinations via a corresponding one of the intermediate destinations, each queue in the database being further associated with a state that is either active or inactive;

upon receipt of a message from the downstream entity indicating a reduced ability of a particular one of the intermediate destinations to accept packets intended to be forwarded to a particular one of the final destinations, rendering inactive the state of the queue associated with packets intended to be forwarded to the particular final destination via the particular intermediate destination; and upon receipt of a message from the downstream entity indicating an increased ability of a particular one of the intermediate destinations to accept packets intended to be forwarded to a particular one of the final destinations, rendering active the state of the queue associated with packets intended to be forwarded to the particular final destination via the particular intermediate destination.

2. A method as defined in claim 1, further comprising:

providing storage for the packets associated with each queue.

3. A method as claimed in claim 2, further comprising:
for each intermediate destination, scheduling packets for transmission to said intermediate destination from amongst the packets belonging to those queues for which the state is active and that are associated with packets intended to be forwarded to any final destination via said intermediate destination.

4. A method as defined in claim 2, further comprising:
determining whether the downstream entity has an ability to receive at least one packet;
upon determining that the downstream entity has the ability to receive at least one packet, selecting at least one packet that has been scheduled for transmission to one of the intermediate destinations and transmitting at least one of the selected at least one packet to the downstream entity.

5. A method as defined in claim 4, wherein selecting at least one packet that has been scheduled for transmission to one of the intermediate destinations includes:
selecting an intermediate destination; and
selecting at least one packet that has been scheduled for transmission to the selected intermediate destination.

6. A method as defined in claim 1, said method being implemented in a congestion manager and further comprising:
maintaining information on memory utilization for each of a plurality of flows, each flow being associated with a corresponding one of the final destinations;
if memory utilization for a particular one of the flows exceeds a first threshold, generating a message indicative of a reduced ability of the congestion manager to accept packets intended to be forwarded to the final destination associated with the particular flow; and
if memory utilization for a particular one of the flows falls below a second threshold, generating a message indicative of an increased ability of the congestion manager to accept packets intended to be forwarded to the final destination associated with the particular flow.

7. A method as defined in claim 6, wherein the first and second thresholds are pre-determined.

8. A method as defined in claim 6, further comprising:
determining total memory utilization for a plurality of said flows; and
adjusting at least one of the first and second thresholds as a function of the total memory utilization for said plurality of said flows.

9. A method as defined in claim 6, further comprising:
receiving the packets from a plurality of upstream entities; and
sending the generated messages to the plurality of upstream entities.

10. A method as defined in claim 9, wherein sending one of the generated messages to the plurality of upstream entities includes broadcasting said one of the generated messages to the plurality of upstream entities.

11. A method as defined in claim 9, further comprising:
maintaining a second database of those upstream entities that have recently sent packets intended to be forwarded to the final destination associated with the particular flow;
wherein sending the generated messages to the plurality of upstream entities includes multicasting said one of the generated messages to those upstream entities in the second database.

12. A method as defined in claim 9, further comprising:
maintaining a second database indicative of the number of packets belonging to a given flow that have been received from each upstream entity since transmission to that upstream entity of a message indicative of a reduced ability of the congestion manager to accept packets intended to be forwarded to the final destination associated with the given flow.

13. A method as defined in claim 12, further comprising:
if the number of packets in the database exceeds a first threshold, for a particular flow and for a particular upstream entity, generating another message indicative of a reduced ability of the congestion manager to accept packets intended to be forwarded to the final destination associated with the particular flow and sending said other message to the particular upstream entity.

14. A method as defined in claim 13, further comprising:
if the number of packets in the database exceeds a second threshold greater than the first threshold, for a particular flow and for a particular upstream entity, generating an alarm message and sending the alarm message to an external entity.

15. A method as defined in claim 6, further comprising:
maintaining an acknowledgement database, wherein the acknowledgement database includes an entry for each combination of upstream source and final destination and an indication of whether the upstream source in each combination of upstream source and final destination has acknowledged receipt of a message previously sent to the plurality of upstream sources and indicative of an increased ability of the congestion manager to accept packets intended to be forwarded to said final destination.

16. A method as defined in claim 15, further comprising:
upon receipt of a message from a particular one of the upstream sources acknowledging receipt of a message previously sent to the plurality of upstream sources and indicative of an increased ability of the congestion manager to accept packets intended to be forwarded to a particular final destination, updating the entry in the acknowledgement database corresponding to the combination of particular upstream source and particular final destination.

17. A method as defined in claim 6, further comprising:
upon receipt of a first message from the downstream entity indicating an increased ability of a particular one of the intermediate destinations to accept packets intended to be forwarded to the final destination associated with a particular flow:
generating an acknowledgement message acknowledging receipt of the first message; and
sending the acknowledgement message to the particular intermediate destination.

18. A method as defined in claim 17, further comprising:
maintaining an acknowledgement database, wherein the acknowledgement database includes an entry for each combination of upstream source and final destination and an indication of whether the upstream source in each combination of upstream source and final destination has acknowledged receipt of a message previously sent to the plurality of upstream sources and indicative of increased ability of the congestion manager to accept packets intended to be forwarded to said final destination.

19. A method as defined in claim 18, further comprising:
upon receipt of a message from a particular one of the upstream sources acknowledging receipt of a message previously sent to the plurality of upstream sources and indicative of an increased ability of the congestion manager to accept packets intended to be forwarded to a particular final destination, updating the entry in the acknowledgement database corresponding to the combination of particular upstream source and particular final destination.

20. A method as defined in claim 6, further comprising: maintaining an acknowledgement database, wherein the acknowledgement database includes an entry for each combination of upstream source and final destination and an indication of whether the upstream source in each combination of upstream source and final destination has acknowledged receipt of a message previously sent to the plurality of upstream sources and indicative of an increased or reduced ability of the congestion manager to accept packets intended to be forwarded to said final destination.

21. A method as defined in claim 20, further comprising: upon receipt of a message from a particular one of the upstream sources acknowledging receipt of a message previously sent to the plurality of upstream sources and indicative of an increased or reduced ability of the congestion manager to accept packets intended to be forwarded to a particular final destination, updating the entry in the acknowledgement database corresponding to the combination of particular upstream source and particular final destination.

22. A method as defined in claim 6, further comprising: upon receipt of a first message from the downstream entity indicating an increased or reduced ability of a particular one of the intermediate destinations to accept packets intended to be forwarded to the final destination associated with a particular flow:
generating an acknowledgement message acknowledging receipt of the first message; and
sending the acknowledgement message to the particular intermediate destination.

23. A method as defined in claim 22, further comprising: maintaining an acknowledgement database, wherein the acknowledgement database includes an entry for each combination of upstream source and final destination and an indication of whether the upstream source in each combination of upstream source and final destination has acknowledged receipt of a message previously sent to the plurality of upstream sources and indicative of increased or reduced ability of the congestion manager to accept packets intended to be forwarded to said final destination.

24. A method as defined in claim 23, further comprising: upon receipt of a message from a particular one of the upstream sources acknowledging receipt of a message previously sent to the plurality of upstream sources and indicative of an increased or reduced ability of the congestion manager to accept packets intended to be forwarded to a particular final destination, updating the entry in the acknowledgement database corresponding to the combination of particular upstream source and particular final destination.

25. A method as defined in claim 6, wherein the congestion manager is implemented in at least one of the intermediate destinations.

26. A method as defined in claim 1, said method being implemented in at least one of the intermediate destinations.

27. A method as claimed in claim 1, wherein the downstream entity is a switch fabric.

28. A method as claimed in claim 1, wherein the intermediate destinations include switch fabric nodes of an intermediate switching stage of a multi-stage packet router.

29. A method as defined in claim 28, said method being implemented in at least one of the intermediate destinations.

30. A computer-readable storage medium containing program instructions for causing execution in a computing device of a method as defined in claim 1.

31. A congestion manager for regulating packet flow to a downstream entity capable of forwarding packets to a plurality of intermediate destinations, comprising:
means for maintaining a database of queues, each queue in the database being associated with packets intended to be forwarded to a corresponding one of a plurality of final destinations via a corresponding one of the intermediate destinations, each queue in the database being further associated with a state that is either active or inactive;
means for rendering inactive, upon receipt of a message from the downstream entity indicating a reduced ability of a particular one of the intermediate destinations to accept packets intended to be forwarded to a particular one of the final destinations, the state of the queue associated with packets intended to be forwarded to the particular final destination via the particular intermediate destination; and
means for rendering active, upon receipt of a message from the downstream entity indicating an increased ability of a particular one of the intermediate destinations to accept packets intended to be forwarded to a particular one of the final destinations, the state of the queue associated with packets intended to be forwarded to the particular final destination via the particular intermediate destination.

32. A computer readable storage medium containing a program element for execution by a computing device to implement a congestion manager for regulating packet flow to a downstream entity capable of forwarding packets to a plurality of intermediate destinations, the program element including:
program code means for maintaining a database of queues, each queue in the database being associated with packets intended to be forwarded to a corresponding one of a plurality of final destinations via a corresponding one of the intermediate destinations, each queue in the database being further associated with a state that is either active or inactive;
program code means for rendering inactive, upon receipt of a message from the downstream entity indicating a reduced ability of a particular one of the intermediate destinations to accept packets intended to be forwarded to a particular one of the final destinations, the state of the queue associated with packets intended to be forwarded to the particular final destination via the particular intermediate destination; and
program code means for rendering active, upon receipt of a message from the downstream entity indicating an increased ability of a particular one of the intermediate destinations to accept packets intended to be forwarded to a particular one of the final destinations, the state of the queue associated with packets intended to be forwarded to the particular final destination via the particular intermediate destination.

33. A congestion manager capable of forwarding packets to a plurality of intermediate destinations, comprising:
a queue processor for maintaining information on a plurality of queues, each queue being associated with packets intended to be forwarded to a corresponding one of a plurality of final destinations via a corresponding one of the intermediate destinations; and a controller in communication with the queue processor;

said controller being adapted to maintain information on a state of each queue, the state of a queue being either active or inactive;

said controller being further adapted to respond to a message from a particular one of the intermediate destinations indicative of a reduced ability of the particular intermediate destination to accept packets intended to be forwarded to a particular one of the final destinations by rendering inactive the state of the queue associated with packets intended to be forwarded to a particular one of the final destinations via the particular intermediate destination; and said controller being further adapted to respond to a message from a particular one of the intermediate destinations indicative of an increased ability of the particular intermediate destination to accept packets intended to be forwarded to a particular one of the final destinations by rendering active the state of the queue associated with packets intended to be forwarded to a particular one of the final destinations via the particular intermediate destination.

34. A congestion manager as defined in claim 33, further comprising:

a memory for providing storage for the packets associated with each queue.

35. A congestion manager as defined in claim 34, the queue processor being further adapted to schedule packets for transmission to each particular one of the intermediate destinations from amongst the packets belonging to those queues for which the state is active and that are associated with packets intended to be forwarded to any final destination via the particular intermediate destination.

36. A congestion manager as defined in claim 35, the queue processor being further adapted to determine whether the downstream entity has an ability to receive at least one packet and, upon determining that the downstream entity has the ability to receive at least one packet, to select at least one packet that has been scheduled for transmission to one of the intermediate destinations and to cause at least one of the selected at least one packet to be extracted from the memory and transmitted to the downstream entity.

37. A congestion manager as defined in claim 33, further comprising:

a classifier connected to the queue processor and to the controller, for determining the final destination to which each packet in a received stream of packets is to be forwarded.

38. A method of regulating packet flow to a downstream entity capable of forwarding packets to a plurality of intermediate destinations, the method comprising:

maintaining a database of queues, each queue in the database being associated with packets of a corresponding one of a plurality of service classes intended to be forwarded to a corresponding one of a plurality of final destinations via a corresponding one of the intermediate destinations, each queue in the database being further associated with a state that is either active or inactive;

upon receipt of a message from the downstream entity indicating a reduced ability of a particular one of the intermediate destinations to accept packets of a particular one of the service classes intended to be forwarded to a particular one of the final destinations, rendering inactive the state of the queue associated with packets of the particular service class intended to be forwarded to the particular final destination via the particular intermediate destination; and upon receipt of a message from the downstream entity indicating an increased ability of a particular one of the intermediate destinations to accept packets of a particular one of the service classes intended to be forwarded to a particular one of the final destinations, rendering active the state of the queue associated with packets of the particular service class intended to be forwarded to the particular final destination via the particular intermediate destination.

39. A method as defined in claim 38, further comprising:

providing storage for the packets associated with each queue.

40. A method as claimed in claim 39, further comprising:

for each intermediate destination, scheduling packets for transmission to said intermediate destination from amongst the packets belonging to those queues for which the state is active and that are associated with packets intended to be forwarded to any final destination via said intermediate destination.

41. A method as claimed in claim 40, further comprising:

maintaining a queue of active queues for each service class, wherein each queue in the queue of queues for a particular service class has a state that is active; and for each intermediate destination, scheduling packets for transmission to said intermediate destination from amongst the packets in the queues contained in each queue of active queues.

42. A computer-readable storage medium containing program instructions for causing execution in a computing device of a method as defined in claim 38.

* * * * *